United States Patent
Lu et al.

(10) Patent No.: US 12,348,854 B2
(45) Date of Patent: Jul. 1, 2025

(54) FOCUSING METHOD, DEVICE, AND COMPUTER-READABLE STORAGE MEDIUM

(71) Applicant: GUANGDONG OPPO MOBILE TELECOMMUNICATIONS CORP., LTD., Guangdong (CN)

(72) Inventors: Yinting Lu, Guangdong (CN); Xiaodong Gao, Guangdong (CN); Runda Dai, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 186 days.

(21) Appl. No.: 18/151,025

(22) Filed: Jan. 6, 2023

(65) Prior Publication Data
US 2023/0164427 A1 May 25, 2023

Related U.S. Application Data

(63) Continuation of application No. PCT/CN2021/097775, filed on Jun. 1, 2021.

(30) Foreign Application Priority Data

Jul. 8, 2020 (CN) .......................... 202010653799.X

(51) Int. Cl.
*H04N 23/63* (2023.01)
*G06F 3/0488* (2022.01)
(Continued)

(52) U.S. Cl.
CPC ......... *H04N 23/632* (2023.01); *G06F 3/0488* (2013.01); *H04N 23/62* (2023.01); *H04N 23/69* (2023.01)

(58) Field of Classification Search
CPC .............. G06F 3/04847; G06F 3/0488; G06F 3/04883; H04N 23/62; H04N 23/631; H04N 23/632; H04N 23/69
See application file for complete search history.

(56) References Cited

U.S. PATENT DOCUMENTS

| 10,645,272 B2 | 5/2020 | Srivastava et al. |
| 2008/0129759 A1 | 6/2008 | Jeon et al. |

(Continued)

FOREIGN PATENT DOCUMENTS

| CN | 102902131 | 1/2013 |
| CN | 103019585 | 4/2013 |

(Continued)

OTHER PUBLICATIONS

EPO, Extended European Search Report for EP Application No. 21838329.7, Oct. 26, 2023.

(Continued)

*Primary Examiner* — Amy R Hsu
(74) *Attorney, Agent, or Firm* — Hodgson Russ LLP

(57) ABSTRACT

A zoom method and a zoom device, and a non-transitory computer-readable storage medium are provided. The method includes operations as follows. A first touch movement operation acting on a first area of a display screen is received, in response to a zoom prompt control being displayed in a shooting interface for capturing a target object, in which the first area is any area of the shooting interface, and an angle between a moving direction of the first touch movement operation and a direction parallel to an arrangement axis of the zoom prompt control is less than or equal to a preset angle. A zoom position mapped on the zoom prompt control is determined, in response to the first touch movement operation. A corresponding zoom parameter based on the zoom position is determined. A focal length (Continued)

for capturing the target object is adjusted based on the zoom parameter.

20 Claims, 11 Drawing Sheets

(51) Int. Cl.
*H04N 23/62* (2023.01)
*H04N 23/69* (2023.01)

(56) References Cited

U.S. PATENT DOCUMENTS

| | | | |
|---|---|---|---|
| 2010/0173678 A1* | 7/2010 | Kim | H04N 23/61 |
| | | | 348/E5.022 |
| 2010/0289825 A1 | 11/2010 | Shin et al. | |
| 2011/0109581 A1 | 5/2011 | Ozawa et al. | |
| 2013/0027353 A1 | 1/2013 | Hyun | |
| 2014/0169778 A1* | 6/2014 | Nakakusu | H04N 23/71 |
| | | | 396/82 |
| 2015/0215524 A1 | 7/2015 | Zhu et al. | |
| 2017/0064192 A1* | 3/2017 | Mori | H04N 23/632 |
| 2019/0174054 A1* | 6/2019 | Srivastava | H04N 23/63 |
| 2019/0391736 A1* | 12/2019 | Tanaka | G06F 3/041 |

FOREIGN PATENT DOCUMENTS

| | | |
|---|---|---|
| CN | 103376924 | 10/2013 |
| CN | 104317494 | 1/2015 |
| CN | 105045501 | 11/2015 |
| CN | 105450921 | 3/2016 |
| CN | 107077239 | 8/2017 |
| CN | 107977148 | 5/2018 |
| WO | 2016191938 | 12/2016 |
| WO | 2017113150 | 7/2017 |

OTHER PUBLICATIONS

WIPO, International Search Report and Written Opinion for PCT/CN2021/097775, Aug. 16, 2021.
CNIPA, First Office Action for CN Application No. 202010653799.X, May 7, 2021.
CNIPA, Notification to Grant Patent Right for Invention for CN Application No. 202010653799.X, Jan. 28, 2022.
EPO, Communication for EP Application No. 21838329.7, Feb. 18, 2025.

* cited by examiner

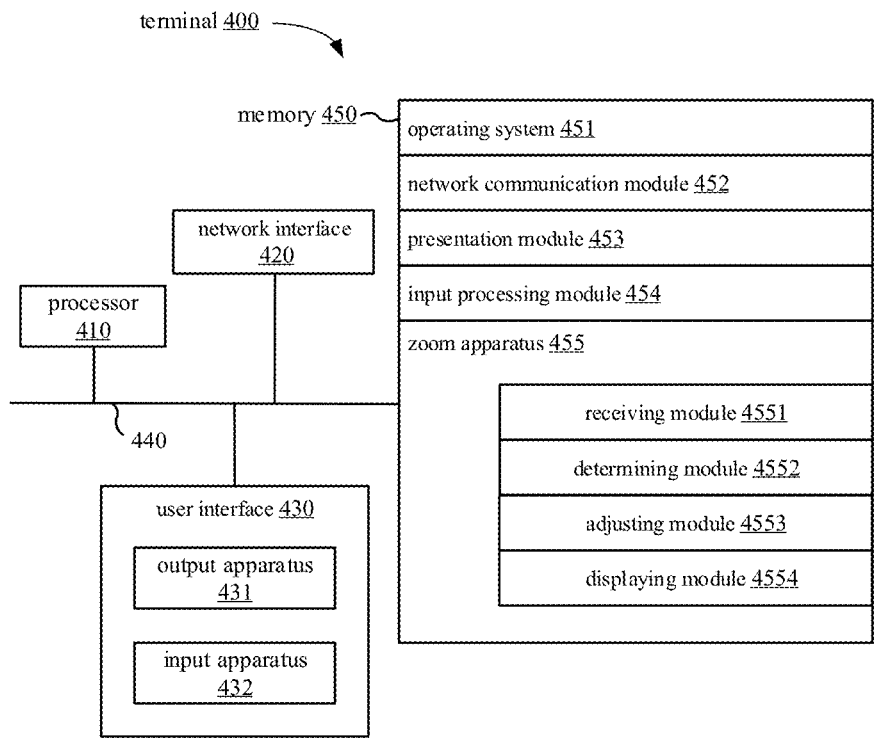

FIG. 2 receiving, in response to a zoom prompt control being displayed in a shooting interface for capturing a target object, a first touch movement operation acting on a first area of a display screen; where the first area is any area of the shooting interface; an angle between a moving direction of the first touch movement operation and a first direction is less than or equal to a preset angle; and the first direction is parallel to an arrangement axis of the zoom prompt control — S101 determining, in response to the first touch movement operation, a zoom position mapped on the zoom prompt control — S102 determining a corresponding zoom parameter based on the zoom position — S103 adjusting, based on the zoom parameter, a focal length for capturing the target object — S104

FIG. 3 receiving, in response to a zoom prompt control being displayed in a shooting interface for capturing a target object, a first touch movement operation acting on a first area of a display screen; where the first area is any area of the shooting interface; an angle between a moving direction of the first touch movement operation and a first direction is less than or equal to a preset angle; and the first direction is parallel to an arrangement axis of the zoom prompt control — S101 determining, in response to the first touch movement operation, a zoom position mapped on the zoom prompt control — S102 determining, based on a preset correspondence between multiple positions of the zoom control and multiple zoom speeds, a real-time zoom speed corresponding to the zoom position, where multiple zoom positions and multiple zoom speeds are in one-to-one correspondence — S1031 adjusting, within the preset unit time, the focal length for capturing the target object according to the real-time zoom speed — S1041

FIG. 13 receiving, in response to a zoom prompt control being displayed in a shooting interface for capturing a target object, a first touch movement operation acting on a first area of a display screen; where the first area is any area of the shooting interface; an angle between a moving direction of the first touch movement operation and a first direction is less than or equal to a preset angle; and the first direction is parallel to an arrangement axis of the zoom prompt control — S101 determining, in response to the first touch movement operation, a zoom position mapped on the zoom prompt control — S102 determining, based on a preset correspondence between multiple positions of the zoom control and multiple zoom speeds, a real-time zoom speed corresponding to the zoom position, where multiple zoom positions and multiple zoom speeds are in one-to-one correspondence — S1031 the zoom prompt control includes a zoom direction indicator which includes a first direction indicator and a second direction indicator; the first direction indicator indicates an increase of the focal length, and the second direction indicator indicates a decrease of the focal length; the real-time zoom speed includes the zoom direction indicator and a zoom rate; an adjustment direction corresponding to the zoom direction indicator of the real-time zoom speed is determined, according to a preset correspondence between direction indicators and zoom direction indicators — S301 increasing, within the preset unit time, the focal length for capturing the target object according to the zoom rate of the real-time zoom speed, when the adjustment direction is to increase the focal length — S302 decreasing, within the preset unit time, the focal length for capturing the target object according to the zoom rate of the real-time zoom speed, when the adjustment direction is to decrease the focal length — S303

FIG. 14

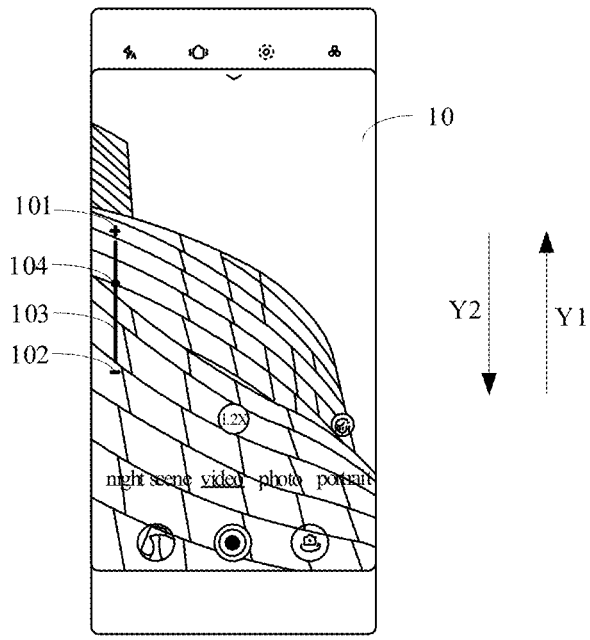

FIG. 15

```
receiving, in response to a zoom prompt control being displayed in a shooting interface
for capturing a target object, a first touch movement operation acting on a first area of a
display screen; where the first area is any area of the shooting interface; an angle
between a moving direction of the first touch movement operation and a first direction    — S101
is less than or equal to a preset angle; and the first direction is parallel to an
arrangement axis of the zoom prompt control
```

```
determining, in response to the first touch movement operation, a zoom position    — S102
mapped on the zoom prompt control
```

```
determining, based on a preset correspondence between multiple positions of the zoom
control and multiple zoom speeds, a real-time zoom speed corresponding to the zoom    —S1031
position, where multiple zoom positions and multiple zoom speeds are in one-to-one
correspondence
```

```
the zoom prompt control includes a zoom direction indicator which includes a first    — S301
direction indicator and a second direction indicator; the first direction indicator
indicates an increase of the focal length, and the second direction indicator indicates a
decrease of the focal length; the real-time zoom speed includes the zoom direction
indicator and a zoom rate; an adjustment direction corresponding to the zoom direction
indicator of the real-time zoom speed is determined, according to a preset
correspondence between direction indicators and zoom direction indicators
```

| increasing, within the preset unit time, the focal length for capturing the target object according to the zoom rate of the real-time zoom speed, and stopping adjusting the focal length in response to the adjusted focal length reaching a maximum focal length threshold — S3021 | decreasing, within the preset unit time, the focal length for capturing the target object according to the zoom rate of the real-time zoom speed, and stopping adjusting the focal length in response to the adjusted focal length reaching a minimum focal length threshold — S3031 |

FIG. 16

FOCUSING METHOD, DEVICE, AND COMPUTER-READABLE STORAGE MEDIUM

CROSS-REFERENCE TO RELATED APPLICATIONS

The application is a continuation of International Application No. PCT/CN2021/097775, filed on Jun. 1, 2021, which claims priority to Chinese Patent Application No. 202010653799.X, filed on Jul. 8, 2020. The entire disclosures of the above-identified applications are incorporated herein by reference.

TECHNICAL FIELD

The disclosure relates to the technical field of mobile terminals, and particularly to a zoom method, a zoom device, and a computer-readable storage medium.

BACKGROUND

A camera lens is a group of lenses, when light parallel to a main optical axis passes through the lenses, the light converges to a point called the focal point. The focal length is a distance from the focal point to the center of the lens (i.e., an optical center). The focal length is an important parameter for a camera to capture images. When capturing an image, a distance between a captured object and the camera (lens) is not always the same, that is, an object distance is not always fixed. Therefore, it is usually necessary to change a distance from a film to the optical center of the lens as the object distance varies to obtain a clear image. The changing process is usually referred to as "focal length adjustment" or "zoom".

In the related technology, the zoom method for the camera subjects to many limitations and poor human-computer interaction when zooming.

SUMMARY

Embodiments of the disclosure provide a zoom method, a zoom device and a computer-readable storage medium.

Technical solutions of the embodiments of the disclosure are implemented as follows.

The embodiments of the disclosure provide a zoom method, including: receiving, in response to a zoom prompt control being displayed in a shooting interface for capturing a target object, a first touch movement operation acting on a first area of a display screen; where the first area is any area of the shooting interface; an angle between a moving direction of the first touch movement operation and a direction parallel to an arrangement axis of the zoom prompt control is less than or equal to a preset angle; determining, in response to the first touch movement operation, a zoom position mapped on the zoom prompt control; determining a corresponding zoom parameter based on the zoom position; and adjusting, based on the zoom parameter, a focal length for capturing the target object.

The embodiments of the disclosure provide a zoom device including a memory and a processor. The memory is configured to store an executable computer program; and the processor is configured to execute the executable computer program stored in the memory to thereby implement the above zoom method.

The embodiments of the disclosure provide a non-transitory computer-readable storage medium. The computer-readable storage medium is stored with a computer program, and the computer program is configured to be executed by a processor to implement the above zoom method.

BRIEF DESCRIPTION OF THE DRAWINGS

FIG. 2 is a schematic structural diagram of a terminal according to some embodiments of the disclosure;

FIG. 3 is a schematic flowchart of a zoom method according to some embodiments of the disclosure;

FIG. 13 is still yet another schematic flowchart of a zoom method according to some embodiments of the disclosure;

FIG. 14 is still yet another schematic flowchart of a zoom method according to some embodiments of the disclosure;

FIG. 15 is a schematic diagram illustrating a display effect of an exemplary zoom prompt control on the shooting interface according to some embodiments of the disclosure;

FIG. 16 is still yet another schematic flowchart of a zoom method according to some embodiments of the disclosure;

DETAILED DESCRIPTION OF PREFERRED EMBODIMENTS

Figure 1:
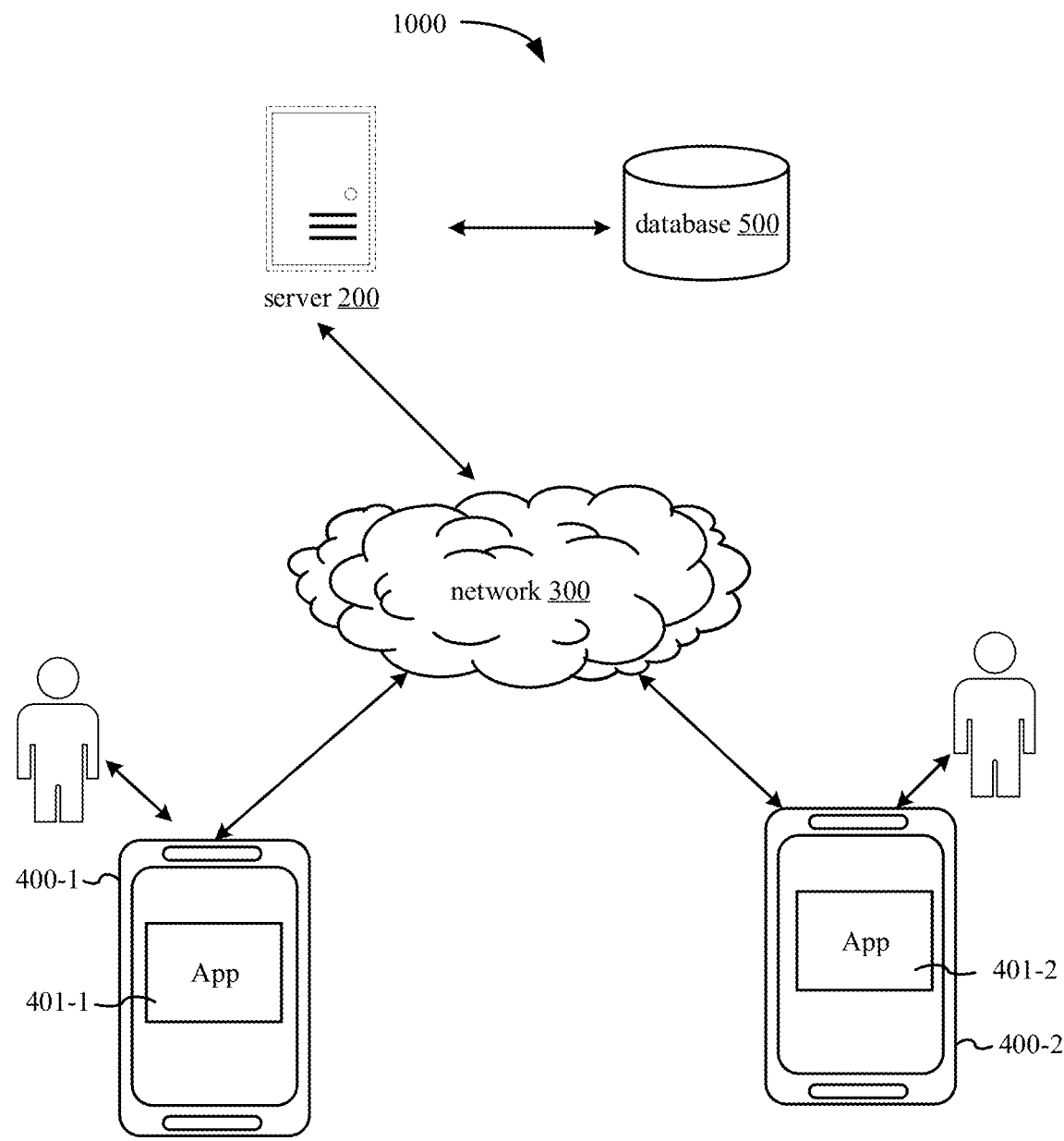
FIG. 1 is a schematic architecture diagram of a zoom system according to some embodiments of the disclosure.

In order to make the objects, technical solutions and advantages of the disclosure clear, embodiments of the disclosure will be described in detail with reference to the drawings. Apparently, the described embodiments should not be regarded as a limitation of the disclosure, and all other embodiments obtained by those of ordinary skill in the art without creative efforts shall fall within the protection scope of the disclosure.

In the following descriptions, reference to the term "some embodiments" describes subsets of all possible embodiments, but it may be understood that the term "some embodiments" may be the same subset or different subsets of all the possible embodiments, and can be combined with each other without conflict.

It should be noted that the term "first/second/third" involved in the following description is merely intended to distinguish similar objects but does not necessarily indicate a specific order of an object. It may be understood that "first/second/third" are interchangeable in terms of a specific order or sequence if permitted, so that the embodiments of the disclosure described herein can be implemented in a sequence in addition to the sequence shown or described herein.

Unless otherwise defined, meanings of all technical and scientific terms used in the embodiments of the disclosure are the same as those usually understood by a person skilled in the art to which the disclosure belongs. The terms used in the embodiments of the disclosure are merely intended to describe objectives of the embodiments of the disclosure, but are not intended to limit the disclosure The embodiments of the disclosure provide a method, an apparatus, a device for zoom and a computer-readable storage medium, which can respond, in any shooting state of the camera, to a zoom touch operation acting at any position on a shooting interface, enlarge the area where the zoom operation can be performed and improve the limitation of focal length adjustment, thereby improving the human-computer interaction performance.

The following illustrates an exemplary application of the zoom device according to the embodiments of the disclosure, which may be implemented as various types of terminals with camera devices such as a smartphone, a tablet computer, and a notebook computer. The zoom device is provided with a display screen, and the display screen may be a display panel integrating touch and display, or may be composed of a display panel and a touch panel covering the display panel. The touch cancel includes any one structure of an infrared type, a resistive type, a surface acoustic wave type, a capacitive type, etc. The embodiments of the disclosure are not limited to these examples. In some embodiments, the zoom device may have a camera device arranged therein, so as to adjust the focal length of the built-in camera device for capturing the target object. In some other embodiments, the zoom device may be communicatively connected to another camera device, so as to send control instructions to the connected camera device to thereby adjust the focal length of the connected camera device for photographing the target object. The embodiments of the disclosure are not limited to these examples. An exemplary application in which the zoom device is implemented as the terminal will be described below.

Referring to FIG. 1, FIG. 1 illustrates the schematic architecture diagram of the zoom system according to some embodiment of the disclosure. To support a zoom application, in the zoom system 1000, a terminal 400 (also referred to as the terminal device, and a terminal 400-1 and a terminal 400-2 are exemplarily illustrated) is connected to a server 200 through a network 300. Specifically, the network 300 may be a wide area network (WAN) or a local area network (LAN), or a combination of the two. The zoom system is described in the following combined with an exemplary scenario in which a first user sends a captured image to a second user in a social application. The first user corresponds to the terminal 400-1, and the second user corresponds to the terminal 400-2. In a social interface of the social application, when realizing the scene of capturing an image and transmitting the image, the terminal 400-1 is configured to receive a first touch movement operation acting on a first area of the display screen, in response to a zoom prompt control being displayed in a shooting interface for capturing a target object. Specifically, the first area is any area of the shooting interface; an angle between a moving direction of the first touch movement operation and a first direction is less than or equal to a preset angle; and the first direction is parallel to an arrangement axis of the zoom prompt control. The terminal 400-1 is configured to determine, in response to the first touch movement operation, a zoom position mapped on the zoom prompt control; determine a corresponding zoom parameter based on the zoom position; and adjust, based on the zoom parameter, a focal length for capturing the target object, and finally obtain a final image captured when the zoom is completed; and display the final image on the graphical interface 401-1.

The server 200 is configured to transmit the final image to the terminal 400-2, in which the final image is captured by the user through the terminal 400-1, so as to enable the terminal 400-2 to display the final image on the graphical interface 401-2.

Referring to FIG. 2, FIG. 2 illustrates a schematic structural diagram of a terminal according to some embodiment of the disclosure. The terminal 400 illustrated in FIG. 2 includes: at least one processor 410, a memory 450, at least one network interface 420 and a user interface 430. Various components in terminal 400 are coupled together by a bus system 440. It can be understood that the bus system 440 is configured to enable connection communication between these components. In addition to a data bus, the bus system 440 further includes a power bus, a control bus and a status signal bus. For clearly illustrating, various buses are all denoted as the bus system 440 in FIG. 2.

The processor 410 may be an integrated circuit chip having a signal processing capability, for example, a general purpose processor, a digital signal processor (DSP), or another programmable logic device (PLD), discrete gate, transistor logical device, or discrete hardware component. Specifically, the general purpose processor may be a microprocessor, any conventional processor, or the like.

The user interface 430 includes one or more output apparatuses 431 that can display media content, including one or more speakers and/or one or more visual display screens. The user interface 430 further includes one or more input apparatuses 432, and the input apparatuses 432 includes a user interface component that facilitates inputting of a user, such as a keyboard, a mouse, a microphone, a touchable display screen, a camera, and other input buttons and controls.

The memory 450 may include a volatile memory or a non-volatile memory, or may include a volatile memory and a non-volatile memory. Specifically, the non-volatile memory may be a read-only memory (ROM), and the volatile memory may be a random access memory (RAM). The memory 450 described in the embodiments of the disclosure is intended to include any suitable types of memories. In some embodiments, the memory 450 includes one or more storage devices that are physically remote from processor 410.

In some embodiments of the disclosure, the memory 450 is configured to store an executable computer program; and the processor 410 is configured to execute the executable computer program stored in the memory to implement the zoom method described in the embodiments of the disclosure.

In some embodiments of the disclosure, the memory 450 may store data to support various operations. Examples of the data include a program, a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another computing device through one or more network interfaces 420 (which are wired or wireless). Exemplary network interfaces 420 include Bluetooth, Wireless Fidelity (Wi-Fi), a universal serial bus (USB), and the like.

A presentation module 453 is configured to enable the presentation of information (such as the user interface for operating a peripheral device and displaying content and information) via one or more output devices 431 (such as the display screen, a speaker, etc.) associated with the user interface 430.

An input processing module 454 is configured to detect one or more user inputs or interactions from one of the one or more input apparatuses 432 and translate the detected input or interaction.

In some embodiments of the disclosure, the software-implemented portion in the terminal according to the embodiments of the disclosure may be implemented as a zoom apparatus. FIG. 2 illustrates the parts of the zoom apparatus 455 stored in the memory 450, which may be a software in the form of programs and plug-ins, and includes the following software modules: a receiving module 4551, a determining module 4552, an adjusting module 4553 and a displaying module 4554. The following describes functions of the modules.

In some other embodiments of the disclosure, the apparatus according to the embodiments of the disclosure may be implemented in a hardware manner. In an example, the apparatus according to embodiments of the disclosure may be a processor in the form of a hardware decoding processor, which is programmed to perform the method for adjusting the position of a virtual button according to the embodiments of this application. For example, the processor in the form of a hardware decoding processor may adopt one or more application specific integrated circuits (ASICs), DSPs, PLDs, complex programmable logic devices (CPLDs), field-programmable gate arrays (FPGAs), or other electronic elements.

By taking an example where the zoom device is a terminal including the display screen and a photographing device (e.g., a camera), the zoom method according to the embodiments of the disclosure will be described in the following in conjunction with an exemplary application and an implementation of the zoom device according to the embodiments of the disclosure.

FIG. 3 is a schematic flowchart of a zoom method according to some embodiments of the disclosure, and the description will be made with reference to the operations illustrated in FIG. 3.

At S101, receiving, in response to a zoom prompt control being displayed in a shooting interface for capturing a target object, a first touch movement operation acting on a first area of a display screen; where the first area is any area of the shooting interface; an angle between a moving direction of the first touch movement operation and a first direction is less than or equal to a preset angle; and the first direction is parallel to an arrangement axis of the zoom prompt control.

In some embodiments of the disclosure, the terminal may control, in response to receiving a camera trigger instruction, the camera to enter the shooting interface, and at this time, the terminal may display the zoom prompt control in any area of the shooting interface to enable the zoom function. When the zoom function is enabled, the terminal may receive the user's first touch movement operation through the first area of the shooting interface displayed on the display screen.

In some embodiments of the disclosure, the first area may include a second area. In this way, the user can either adjust the focal length by touching a display area of the zoom prompt control, or adjust the focal length of the camera by acting a touch movement operation on an area of the shooting interface other than the display area corresponding to the zoom prompt control.

For example, when the first area includes the second area, the terminal may receive the user's first touch movement operation acting on the display area of the zoom prompt control, and determine the corresponding zoom parameter in response to receiving the first touch movement operation acting on the display area of the zoom prompt control, and finally adjust, according to the determined zoom parameter, the focal length for capturing the target object.

In some other embodiments of the disclosure, the first area may be an area other than the second area on the shooting interface, where the second area is the display area of the zoom prompt control.

In some other embodiments of the disclosure, when the zoom function is enabled, the terminal may receive the user's first touch movement operation acting on the first area and the second area of the shooting interface on the displaying screen.

In some embodiments of the disclosure, the shooting interface may be a shooting interface of the working camera, such as an interface of the terminal for capturing a video or an image. The shooting interface is not limited to these examples in the embodiments of the disclosure. The terminal may control the camera to enter the shooting interface to capture the target object and real-timely display the captured image of the target object in the shooting interface, in response to receiving the camera trigger instruction, i.e., when the user clicks a shooting control in a shooting control interface.

It should be noted that the terminal may not display the zoom prompt control in response to entering the shooting interface, and the terminal may display the zoom prompt control and exit the display of the zoom prompt control through a touch operation acting on the shooting interface, which will be described in detail.

In some other embodiments of the disclosure, the zoom prompt control may be configured to indicate an adjustment direction and a zoom position of the focal length, so that a real-time zoom progress and a real-time zoom position are displayed during the process of the user's focal length adjustment, thereby prompting the user for the zoom operation. Specifically, the adjustment direction of the focal length may include increasing the focal length and decreasing the focal length. The arrangement axis of the zoom prompt control may be in a horizontal direction or a vertical direction, etc., which is not limited in this embodiment of the disclosure. However, the angle between the movement direction of the first touch movement operation and the first direction is less than or equal to the preset angle, in which the first direction is parallel to the arrangement axis of the zoom prompt control.

In some embodiments of the disclosure, the first touch movement operation may be a touch operation sliding along a preset direction, and the first touch movement operation is also referred to as a sliding operation for short. The movement direction of the first touch movement operation is an extension direction from a starting touch position to various real-time touch positions in a movement trajectory generated by the first touch movement operation on the display screen. In some embodiments of the disclosure, the first touch movement operation may be a sliding operation with the angle between the sliding direction and the first direction being less than or equal to the preset angle, in which the first direction is parallel to the arrangement axis of the zoom prompt control. In some embodiments, the arrangement axis of the zoom prompt control may refer to the extension direction of the zoom progress bar, along which the zoom control may move on the zoom progress bar.

In some embodiments of the disclosure, the preset angle is a small angle or a small angle range which are set in advance, for example, the preset angle may be within 30°, which is not limited in the embodiments of the disclosure.

That is to say, when the angle between the sliding direction of the user's finger acting on the first area of the display screen and the direction parallel to the arrangement axis of the zoom prompt control is less than or equal to 30°, the sliding operation may be determined as the first touch movement operation.

Figure 4:
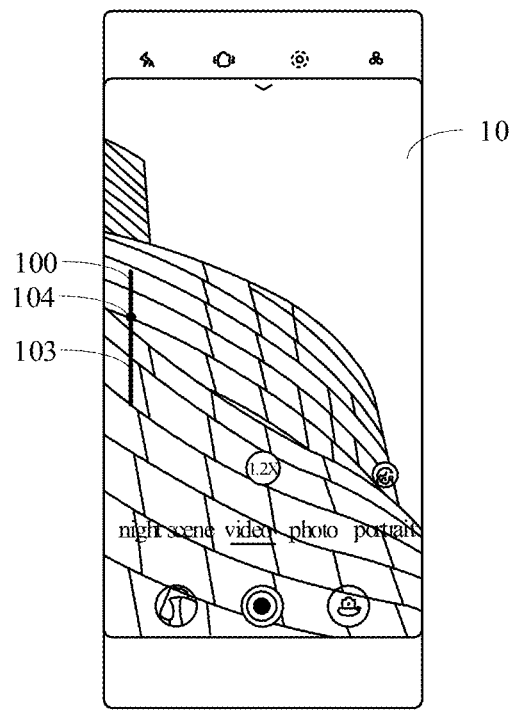
FIG. 4 is a schematic diagram illustrating a display effect of an exemplary zoom prompt control on a shooting interface according to some embodiments of the disclosure.
Figure 5:
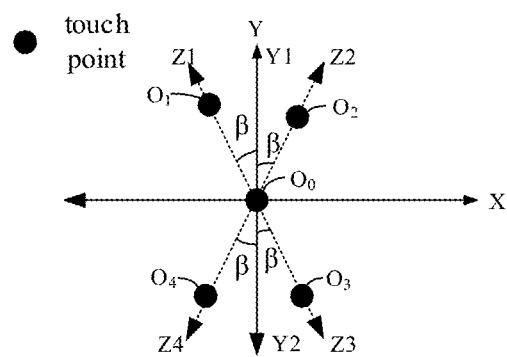
FIG. 5 is a schematic diagram illustrating a relationship of an angle between each of sliding directions of four exemplary different sliding operations and a first direction according to some embodiments of the disclosure.

Exemplarily, FIG. 4 is a schematic diagram illustrating a display effect of an exemplary zoom prompt control on a shooting interface according to some embodiments of the disclosure. As illustrated in FIG. 4, the zoom prompt control 100 is vertically arranged on the first area 11 of the shooting interface 10. FIG. 5 is a schematic diagram illustrating a relationship of an angle between each of sliding directions of four exemplary different sliding operations and a first direction according to some embodiments of the disclosure. As illustrated in FIG. 5, Y represents the first direction parallel to the arrangement axis of the zoom prompt control 100, Y includes two opposite directions Y1 and Y2, and X represents a direction perpendicular to the arrangement axis of the zoom prompt control 100. $O_0$ represents a starting touch position of the sliding operation, $O_1$, $O_2$, $O_3$ and $O_4$ respectively represent real-time touch positions (i.e., positions of real-time touch points) generated in the sliding of four different sliding operations. A direction $Z_1$ from $O_0$ to $O_1$ is a sliding direction of a first sliding operation, and a direction $Z_2$ from $O_0$ to $O_2$ is a sliding direction of a second sliding operation. By analogy, a direction $Z_3$ from $O_0$ to $O_3$ is a sliding direction of a third sliding operation, a direction $Z_4$ from $O_0$ to $O_4$ is a sliding direction of a fourth sliding operation. As illustrated in FIG. 5, the first sliding operation, the second sliding operation, the third sliding operation or the fourth sliding operation, with the angle β between the corresponding sliding directions $Z_1$, $Z_2$, $Z_3$ or $Z_4$ and the direction Y is less than or equal to 30°, may be determined as the first touch movement operation.

In some other embodiments of the disclosure, the terminal may determine the movement direction of the sliding operation based on a relative position relationship between the starting touch position of the sliding operation and at least one of the real-time touch positions generated in the sliding of the sliding operation.

Figure 6:
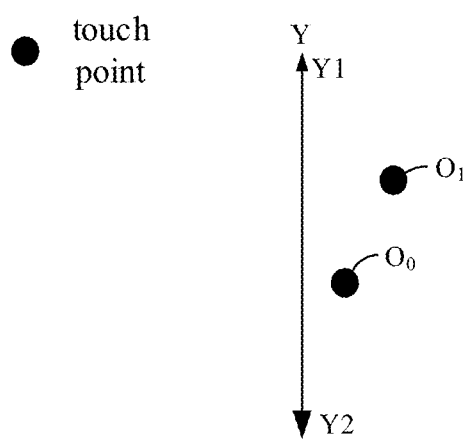
FIG. 6 is a schematic diagram illustrating a relationship between a movement trajectory of an exemplary first touch movement operation and the first direction according to some embodiments of the disclosure.

Exemplarily, FIG. 6 is a schematic diagram illustrating a relationship between a movement trajectory of an exemplary first touch movement operation and the first direction according to some embodiments of the disclosure. As illustrated in FIG. 6, Y represents the first direction parallel to the arrangement axis of the zoom prompt control, Y includes two opposite directions Y1 and Y2, $O_0$ represents a starting touch position of the first touch movement operation, and $O_1$ represents a real-time touch position generated by performing the first touch movement operation. As illustrated in FIG. 6, since the starting touch position $O_0$ is located below the real-time touch position $O_1$, the terminal may determine that the starting touch position $O_0$ points upward to the real-time touch position $O_1$. Therefore, the terminal may determine the upward direction Y1 as the movement direction of the first touch movement.

At S102, determining, in response to the first touch movement operation, a zoom position mapped on the zoom prompt control.

In some embodiments of the disclosure, the terminal receives the first touch movement operation through the display screen, and determines the real-time zoom position on the zoom prompt control in response to the movement distance and the movement direction of the first touch movement operation in the movement process. The terminal displays the real-time zoom position on the zoom prompt control as the movement of the first touch movement operation, so that the user can be informed of current zoom progress through the real-time position on the zoom prompt control.

It should be noted that, in the embodiments of the disclosure, the zoom prompt control includes a zoom progress bar and a zoom control. The user's touch operation performed on the display screen of the terminal, i.e., the first touch movement operation, may accordingly control a movement of the zoom control of the zoom prompt control, and a real-time position of the zoom control on the zoom progress bar is acquired in the action process of the user's touch operation.

Figure 7:
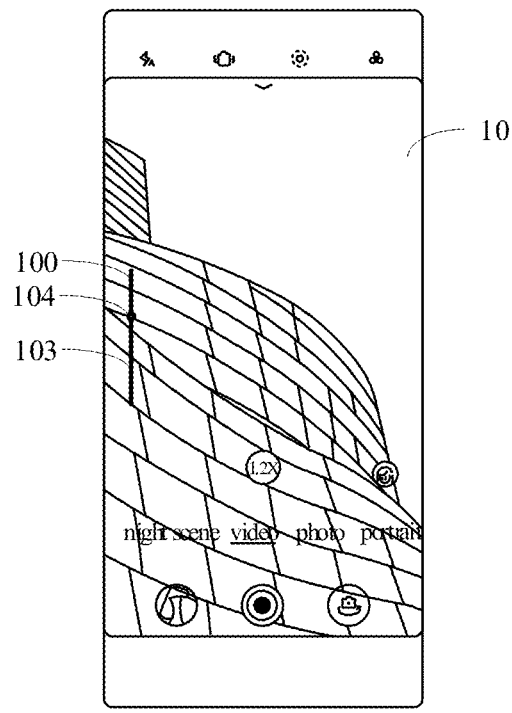
FIG. 7 is a schematic diagram illustrating a display effect of an exemplary zoom progress bar and a zoom control on a shooting interface according to some embodiments of the disclosure.

Exemplarily, FIG. 7 is a schematic diagram illustrating a display effect of an exemplary zoom progress bar and a zoom control on a shooting interface according to some embodiments of the disclosure. As illustrated in FIG. 7, the zoom prompt control 100 includes the zoom progress bar 103 and the zoom control 104. The position of the zoom control 104 on the zoom progress bar 103 may change correspondingly as the movement of the first touch movement operation.

In some embodiments of the disclosure, the movement distance corresponding to the first touch movement operation is positively related to the zoom position of the zoom control on the zoom progress bar, and the movement distance corresponding to the first touch movement operation may correspond to a distance between the zoom position and the starting position of the zoom control on the zoom progress bar. Furthermore, the longer the movement trajectory corresponding to the first touch movement operation, the farther the distance between the zoom position of the zoom control on the zoom progress bar and the initial position of the zoom control.

At S103, determining a corresponding zoom parameter based on the zoom position.

In some embodiments of the disclosure, different positions on the zoom prompt control correspond to different zoom parameters. When the real-time zoom position mapped on the zoom prompt control has been determined, the terminal may determine the zoom parameter corresponding to the real-time zoom position.

In some embodiments of the disclosure, the zoom parameter of the disclosure may be a value of focal length, or an amount of focal length adjustment within a preset unit time, etc. The embodiments of the disclosure are not limited to these examples.

Exemplarily, the zoom parameter corresponding to a position on the zoom prompt control may represent a value of focal length or an amount of focal length adjustment within a preset unit time, etc. corresponding to the position. The embodiments of the disclosure are not limited to these.

Exemplarily, when the zoom parameter is the value of focal length, and the terminal has determined that the zoom control is at the first position of the zoom progress bar, the terminal may determine the value of focal length corresponding to the first position.

At S104, adjusting, based on the zoom parameter, a focal length for capturing the target object.

In some embodiments of the disclosure, when acquiring the zoom parameter, the terminal may increase or decrease the focal length of the target object for capturing the target object according to the zoom parameter.

In some embodiments of the disclosure, when the zoom parameter is the value of focal length, the terminal may transmit an adjustment instruction to the camera, so that the camera directly adjusts, according to the received adjustment instruction, a current focal length for capturing the target object to the value of focal length. In some other embodiments of the disclosure, when the zoom parameter is the amount of focal length adjustment within the preset unit time, the terminal may transmit an adjustment instruction to the camera, so that the camera decreases or increases, according to the received adjustment instruction, a current focal length for capturing the target object by the amount of focal length adjustment.

It can be understood that, when the zoom function is enabled, the first touch movement operation acting in any area of the shooting interface for capturing the target object is detectable. In this way, the function of adjusting the focal length for capturing the target object can be realized by the touch operation acting in any area. That is to say, a zoom touch operation may be performed in an area without the zoom prompt control, so that the range of focal length adjustment is improved, thereby improving human-computer interaction performance.

Figure 8:
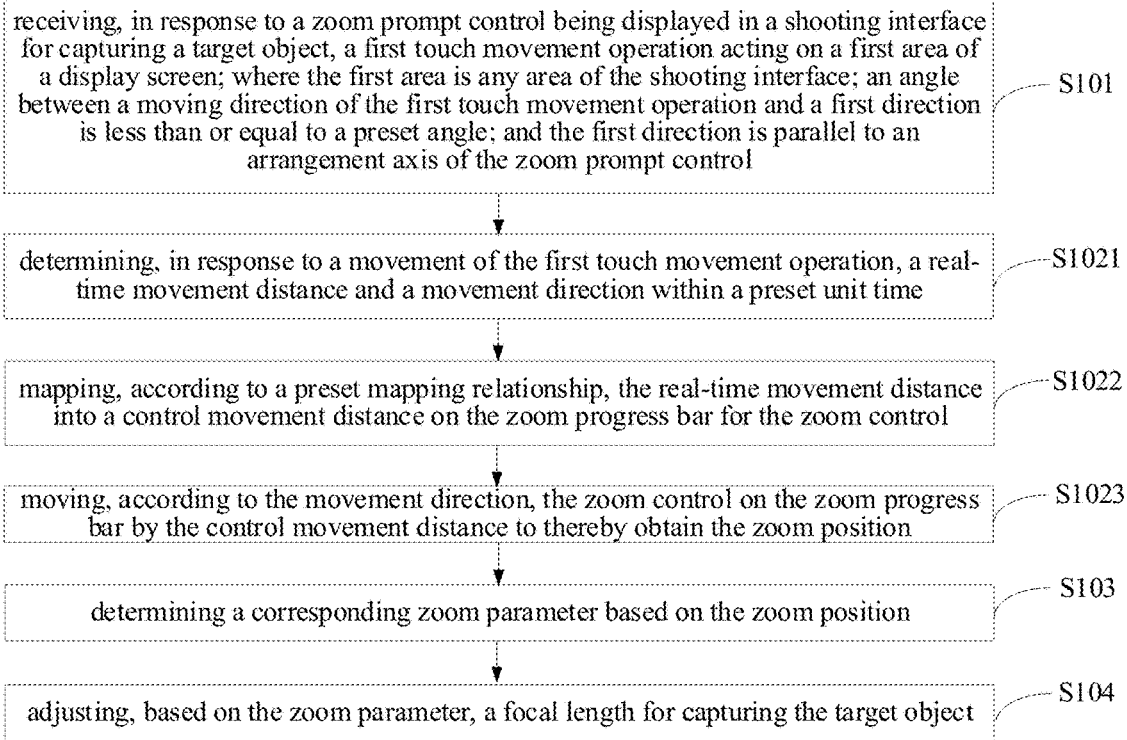
FIG. 8 is another schematic flowchart of a zoom method according to some embodiments of the disclosure.

FIG. 8 is another schematic flowchart of a zoom method according to some embodiment of the disclosure. The zoom prompt control includes the zoom progress bar and the zoom control. The operation of S12 may be implemented by S1021 to S1023, which will be explained with reference to the operations illustrated in FIG. 8.

At S1021, determining, in response to a movement of the first touch movement operation, a real-time movement distance and a movement direction within a preset unit time.

In some embodiments of the disclosure, when receiving the first touch movement operation acting on the display screen, the terminal may determine, during the performing of the first touch movement operation, the real-time movement distance and the real-time movement direction on the display screen within the preset unit time.

In some embodiments of the disclosure, the preset unit time may correspond to a frequency of the terminal to acquire the movement distance of the first touch movement operation during the movement process of the first touch movement operation. For example, the frequency may be 1 second or 20 milliseconds, etc., which is not limited in the embodiments of the disclosure. When the preset unit time is 1 second, the real-time movement distance of the first touch movement operation within the preset unit time is the distance between a real-time touch position and the initial touch position that is acquired every second.

It should be noted that, in the embodiments of the disclosure, the terminal performs the determination of the real-time movement distance and the movement direction at the arrival time of each preset unit time in the movement process of the first touch movement operation.

In some embodiments of the disclosure, the terminal may determine the movement direction within the preset unit time, based on a relative position relationship between the starting touch position of the first touch movement operation and the real-time touch position corresponding to the preset unit time.

Exemplarily, as illustrated in FIG. 6, it is described by taking the preset unit time as one second as an example. $O_0$ represents the starting touch position of the first touch movement operation, and $O_1$ represents the real-time touch position where the first touch movement operation is performed at the end of the one second in the movement process of the first touch movement operation. Since the starting touch position $O_0$ is located below the real-time touch position, the starting touch position $O_0$ points upward to the real-time touch position $O_1$, and the terminal may determine the upward direction Y1 as the movement direction of the first touch movement operation corresponding to the one second.

At S1022, mapping, according to a preset mapping relationship, the real-time movement distance into a control movement distance on the zoom progress bar for the zoom control; and In some embodiments of the disclosure, there is a preset mapping relationship between the real-time movement distances of the first touch operation and the control movement distances of the zoom control, after acquiring the real-time movement distance of the first touch operation, the terminal may determine the control movement distance on the zoom progress bar for the zoom control, based on the preset mapping relationship and the real-time movement distance of the first touch operation. The zoom prompt control includes the zoom progress bar and the zoom control.

In some embodiments of the disclosure, the first touch movement operation may be performed on the zoom progress bar or the zoom prompt control, which is not limited in the embodiments of the disclosure.

It should be noted that the preset mapping relationship is a correspondence relationship or a proportional relationship between the movement distances of the first touch movement operation on the display screen and the movement distances on the zoom prompt control for the zoom control. After acquiring the first touch movement operation's real-time movement distance on the display screen, the terminal may reckon the control movement distance on the zoom progress bar for the zoom control based on the movement distance of the first touch movement operation and the proportional relationship.

In some embodiments of the disclosure, the preset mapping relationship is configured to map a movement speed and an action time of the first touch movement operation on the display screen into a movement speed and an action time on the zoom prompt control, thereby obtaining the control movement distance of the zoom control.

Exemplarily, when the preset mapping relationship is a corresponding relationship between the movement trajectory of the first touch movement and the movement trajectory of the zoom control, the preset mapping relationship between the real-time movement distance of the first touch movement operation and the control movement distance of the zoom control may be such that the zoom control moves 0.2L on the zoom progress bar for every 200 pixels increase in the real-time movement distance of the first touch movement operation, where L represents a total length of the zoom progress bar. The preset mapping relationship may be arbitrarily set according to actual needs. In the embodiments of the disclosure, the preset mapping relationship is not limited to these illustrated examples.

At S1023, moving, according to the movement direction, the zoom control on the zoom progress bar by the control movement distance to thereby obtain the zoom position.

In some embodiments of the disclosure, after acquiring the first touch movement operation's movement direction within the preset unit time and the control movement distance on the zoom progress bar for the zoom control, the terminal may move, according to the movement direction, the zoom control on the zoom progress bar by the control movement distance within the preset unit time, thereby obtaining the real-time zoom position. Specifically, the real-time zoom position refers to the zoom control's current position on the zoom progress bar.

In the illustrated embodiments of the disclosure, the terminal determines the control movement distance for the zoom control according to the movement distance and the movement direction of the first touch movement operation. In addition, the terminal moves the zoom control on the zoom progress bar by the movement distance to obtain the zoom position. During the zoom process, the terminal may control, in response to the user's first touch movement operation performed on the first area, the corresponding zoom position on the zoom progress bar, and display the zoom position through the zoom progress bar and the zoom control. In this way, the zoom process is intuitive.

Figure 9:
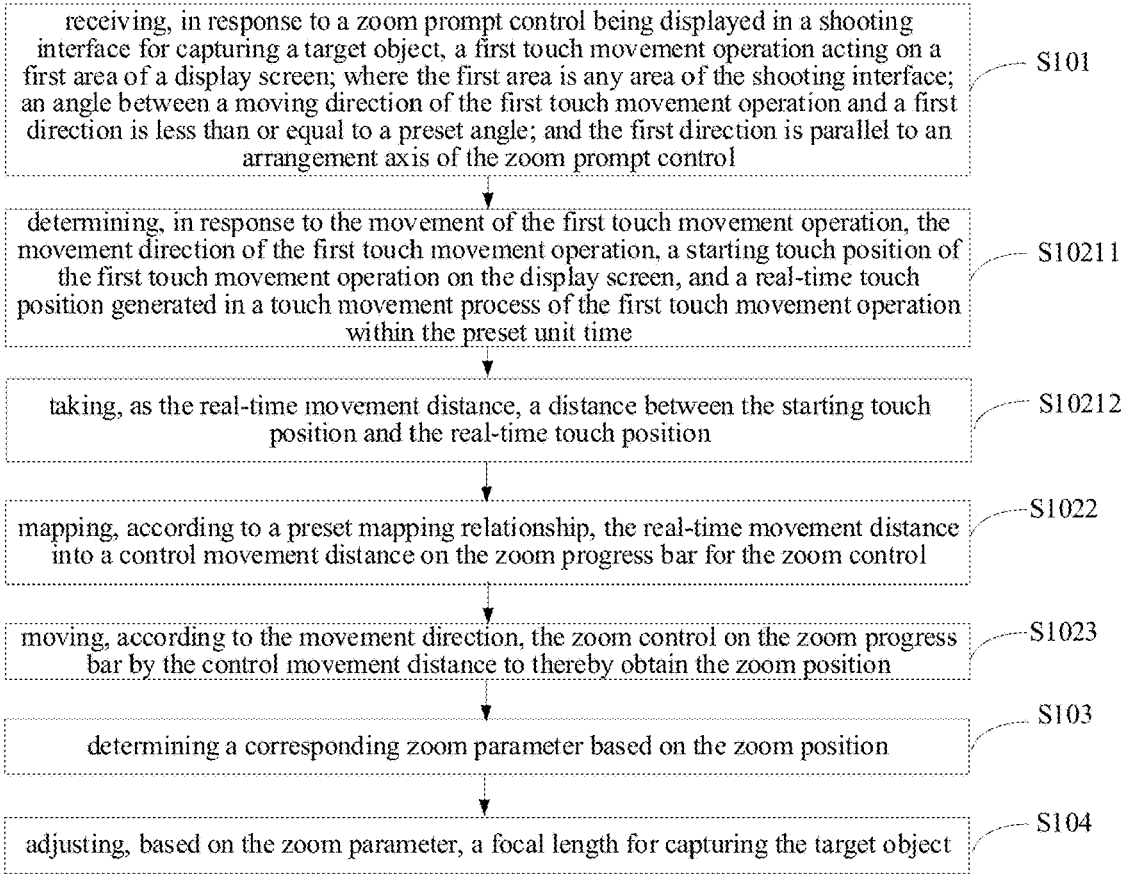
FIG. 9 is yet another schematic flowchart of a zoom method according to some embodiments of the disclosure.

FIG. 9 is yet another schematic flowchart of a zoom method according to some embodiment of the disclosure. The operation of S1021 may be implemented by S10211 to S10212, which will be explained with reference to operations illustrated in FIG. 9.

At S10211, determining, in response to the movement of the first touch movement operation, the movement direction of the first touch movement operation, a starting touch position of the first touch movement operation on the display screen, and a real-time touch position generated in a touch movement process of the first touch movement operation within the preset unit time.

In some embodiments of the disclosure, when receiving the first touch movement operation, the terminal may acquire, every time the preset unit time ends in the action process of the first touch movement operation, the starting touch position of the first touch movement operation and the real-time touch position generated in the touch movement process of the first touch movement operation.

It should be noted that, in the embodiments of the disclosure, during the user acts the touch movement operation, the terminal may acquire the touch operation every time the preset unit time ends.

Exemplarily, when the preset unit time is 1 second, the real-time touch position generated in the touch movement process of the first touch movement operation at the end of every one second refers a position of a real-time touch point acquired every second. That is, a position of a real-time touch point P1 is acquired at the end of a first 1-second time, and a position of a real-time touch point P2 is acquired at the end of a second 1-second time.

At S10212, taking, as the real-time movement distance, a distance between the starting touch position and the real-time touch position.

In some embodiments of the disclosure, after acquiring the position of the real-time touch point, the terminal may determine the real-time movement distance as the distance between the real-time touch point and the starting touch point along with the direction parallel to the arrangement axis of the zoom prompt control.

Exemplarily, it is illustrated by taking FIG. 5 as an example. When the touch position is the position of the touch point and the preset unit time is 1 second, $O_0$ represents the starting touch position of the first touch movement operation, $O_1$ represents the real-time touch position acquired at a second 1-second time, and the distance between the starting touch position $O_0$ and the real-time touch position $O_1$ along the Y direction may be taken as the real-time movement distance of the first touch movement operation during the preset unit time (i.e., in the second 1-second time period).

In the illustrated embodiments of the disclosure, in the movement process of the first touch movement operation, the terminal determines, as the real-time movement distance, the distance between the starting touch position of the first touch movement operation, and the real-time touch position generated in the touch movement process of the first touch movement operation within the preset unit time. As such, the terminal can accurately determine the real-time movement distance of the first touch movement operation during the movement of the first touch movement operation.

Figure 10:
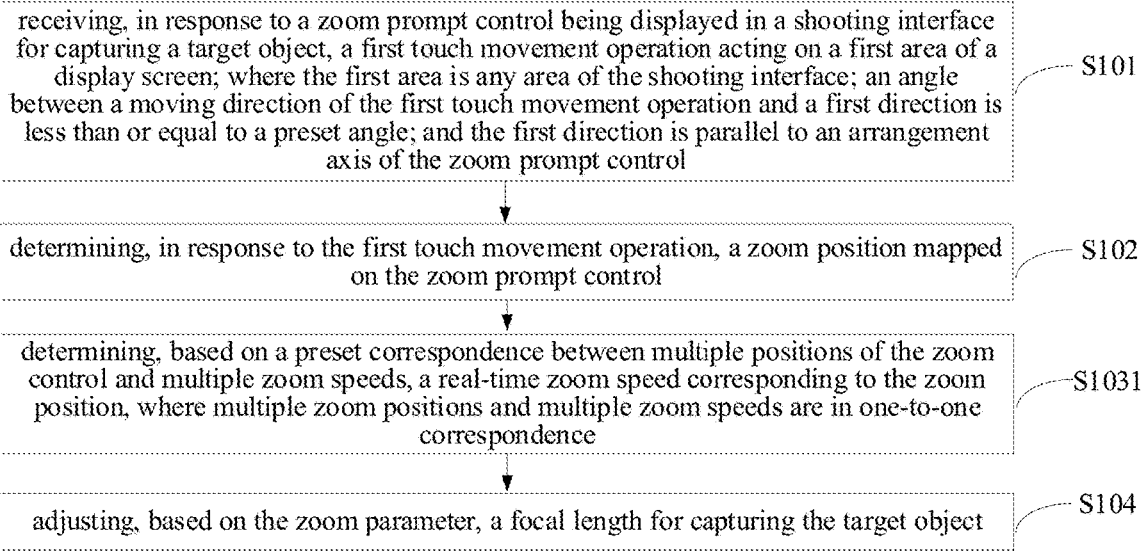
FIG. 10 is still a schematic flowchart of a zoom method according to some embodiments of the disclosure.

FIG. 10 is still a schematic flowchart of a zoom method according to some embodiment of the disclosure. The zoom parameter includes a zoom rate. Based on the above, the S103 may be implemented by S1031, which will be explained with reference to the operations illustrated in FIG. 10.

At S1031, determining, based on a preset correspondence between multiple positions of the zoom control and multiple zoom speeds, a real-time zoom speed corresponding to the zoom position, where the plurality of positions and the plurality of zoom speeds are in one-to-one correspondence.

In some embodiments of the disclosure, different positions on the zoom progress bar correspond to different zoom speeds, and each position corresponds to only one of the zoom speeds. When the zoom control is located at a certain position of the zoom progress bar, such position is taken as the zoom position, and the zoom speed corresponds to the position is taken as the zoom speed corresponds to the zoom position.

In some embodiments of the disclosure, the zoom parameter may include the zoom speed, which refers to the amount of focal length adjustment within the preset unit time.

In the illustrated embodiments of the disclosure, the zoom speed includes a zoom direction indicator, a zoom value, and a numerical unit, which are not limited in the embodiments of the disclosure. Specifically, the zoom direction indicator includes two kinds of indicators, i.e., an increase indicator and a decrease indicator. Exemplarily, the increase indicator may be a character "+", and the decrease indicator may be a character "−".

Exemplarily, the zoom speed may be +3×/S, where × represents a focal length magnification, and S represents seconds (i.e., the numerical unit), and +3×/S represents that the focal length of the camera is increased by 3× (i.e., zoom value) per second.

Figure 11:
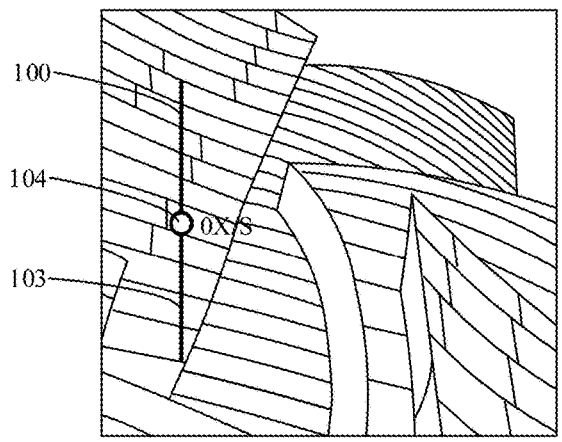
FIG. 11 is a schematic diagram illustrating a display effect of an exemplary zoom prompt control on a part of the shooting interface according to some embodiments of the disclosure.

In some embodiments of the disclosure, the length L of the zoom progress bar may be divided from the center position into two parts, i.e., a part denoted as L1 and a part denoted as L2, and the part L1 and the part L2 are respectively divided into multiple lengths denoted as 1. A number and a zoom speed are sequentially set to each length l, with the zoom speed corresponding to the length l in the part L1 gradually increasing with the increase of the corresponding number, the zoom speed corresponding to the length l in the part L2 gradually decreases with the increase of the corresponding number, and the zoom speed corresponding the center position of the zoom progress bar is set as a preset initial zoom speed. For example, the preset initial zoom speed maybe 0. FIG. 11 illustrates a schematic diagram illustrating a display effect of an exemplary zoom prompt control on a part of the shooting interface according to some embodiment of the disclosure. When the zoom control 104 is located at the center of the zoom progress bar 103, the current zoom speed is 0.

It can be understood that, through the above settings, when the zoom control moves towards an end of the zoom progress bar and passes through different positions, the zoom speed corresponding to the different positions gradually decreases; in addition, when the zoom control moves towards the other end of the zoom progress bar and passes through different positions, the zoom speed corresponding to the different positions gradually increases.

Figure 12A:
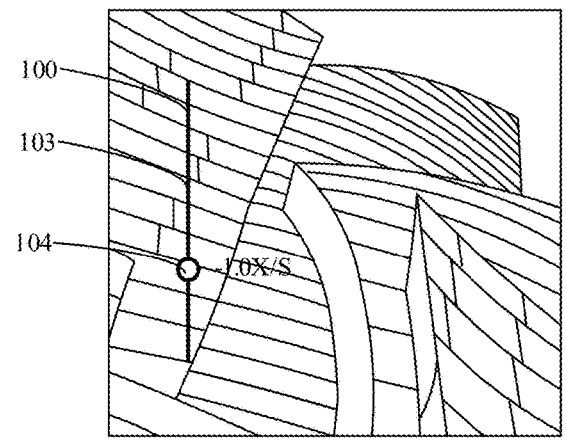
FIG. 12A is a schematic diagram illustrating a display effect of another exemplary zoom prompt control on a part of the shooting interface according to some embodiments of the disclosure.
Figure 12B:
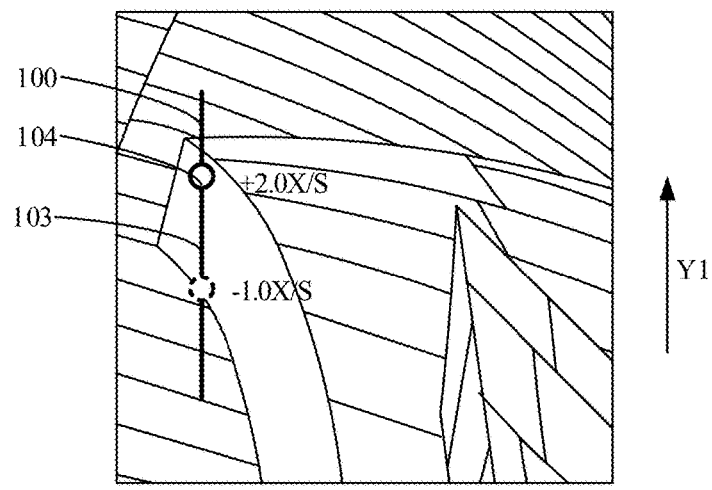
FIG. 12B is a schematic diagram illustrating a display effect of still another exemplary zoom prompt control on a part of the shooting interface according to some embodiments of the disclosure.

Exemplarily, FIG. 12A is a schematic diagram illustrating a display effect of another exemplary zoom prompt control on a part of the shooting interface according to some embodiment of the disclosure; FIG. 12B is a schematic diagram illustrating a display effect of still another exemplary zoom prompt control on a part of the shooting interface according to some embodiment of the disclosure. As illustrated in FIGS. 12A and 12B, when the zoom control 104 moves on the zoom progress bar 103 along the direction Y1 (a direction parallel to the arrangement axis of the zoom prompt controls 100) to an end of the zoom progress bar and passes different positions of the zoom progress bar, the zoom speed will gradually increase from −1×/S to +2×/S, the corresponding focal length of the camera will gradually decrease when the zoom speed changes from 0×/S to −1×/S, and the corresponding focal length of the camera will also gradually increase when the zoom speed increase from 0×/S to +2×/S, and the zoom speed represents that a decrease of the focal length by 1× per second is changed to an increase of focal length by 2× per second.

In some other embodiments of the disclosure, the length denoted as L of the zoom progress bar includes multiple lengths denoted as l, each length l is provided with a number and a zoom speed denoted as V, with the zoom speed corresponding to the length l gradually increasing with the increase of the number corresponding to the length l. For example, the length L of the zoom progress bar includes 100 length l, with the zoom speed V1 corresponding to the first length 1 being less than the zoom speed V2 corresponding to the second length l. By analogy, the zoom speed corresponding to the length l with the largest number is the largest zoom speed.

In some other embodiments of the disclosure, after determining the zoom parameter (a real-time zoom parameter) corresponding to the zoom position, the terminal further displays the zoom parameter in the shooting interface to prompt the user, so that the zoom process is intuitive.

In the illustrated embodiments of the disclosure, when the zoom parameter includes the zoom speed, the terminal adjusts the focal length of the camera according to the real-time zoom speed corresponding to the zoom position, so that the zoom position may correspond to the zoom process, and the zoom process is intuitive.

FIG. 13 is still yet another schematic flowchart of a zoom method according to some embodiment of the disclosure. The operation of S104 may be implemented by S1041, which will be explained with reference to the operations illustrated in FIG. 13.

At S1041, adjusting, within the preset unit time, the focal length for capturing the target object according to the real-time zoom speed.

In some embodiments of the disclosure, after acquiring the real-time zoom speed corresponding to the zoom position, the terminal may adjust, according to the real-time zoom speed, the focal length for capturing the target object within the preset unit time.

In the embodiments of the disclosure, a time unit of the zoom speed may be the preset unit time.

Exemplarily, when the zoom speed is +3×/S, the preset unit time is 1 S (second).

In some embodiments of the disclosure, the zoom position is relevant to the real-time movement distance of the first touch movement operation, and the real-time movement distance of the first touch movement operation is relevant to the real-time touch position where the first touch movement operation acts within the preset unit time. Thus, the terminal acquires the touch position of the first touch movement operation at a preset acquisition frequency, each time point for acquisition (within the preset unit time) corresponds to a touch position which is corresponding to a zoom position, and each the zoom position corresponds to a zoom speed. Based on the above, each preset unit time corresponds to a zoom speed. The terminal may adjust, within the zoom speed, the focal length of the camera at the corresponding zoom speed. For example, in the first 1-second (preset unit time), the zoom position is a first zoom position and the focal length is adjusted at a zoom speed V1 corresponding to the first zoom position; in the second 1-second, the zoom position is a second zoom position and the focal length is adjusted at a zoom speed V2 corresponding to the second zoom position; in a third 1-second, the focal length is adjusted at the zoom speed V2 corresponding to the second zoom position when the zoom position is still the second zoom position, and the focal length is adjusted until the zoom speed reaches the maximum or the minimum value of the zoom speed.

FIG. 14 is still yet another schematic flowchart of a zoom method according to some embodiment of the disclosure. The zoom prompt control includes a zoom direction indicator which includes a first direction indicator and a second direction indicator; the first direction indicator indicates an increase of the focal length, and the second direction indicator indicates a decrease of the focal length; and the real-time zoom speed includes the zoom direction indicator and a zoom rate. The operation of S1041 may be implemented by S1041, which will be explained with reference to the operations illustrated in FIG. 14.

At S301, determining, according to a preset correspondence between direction indicators and zoom direction indicators, an adjustment direction corresponding to the zoom direction indicator of the real-time zoom speed.

In some embodiments of the disclosure, after acquiring the real-time zoom speed, the terminal may first determine the zoom direction indicator and the zoom rate of the real-time zoom speed. Then, it is determined whether to increase the focal length or decrease the focal length according to the preset correspondence between the direction indicators and the zoom direction indicators.

In some embodiments of the disclosure, the zoom prompt control includes the zoom direction indicator which includes the first direction indicator and the second direction indicator. The first direction identification indicates the increase of the focal length, and the second direction indicator indicates the decrease of the focal length; and the real-time zoom speed includes the zoom direction indicator and the zoom rate.

Exemplarily, the first direction indicator may be a character "+", the second direction indicator may be a character "−", and the first direction indicator and the second direction indicator are located at two ends of the zoom progress bar, respectively.

Exemplarily, FIG. 15 is a schematic diagram illustrating a display effect of an exemplary zoom prompt control on the shooting interface according to some embodiment of the disclosure. As illustrated in FIG. 15, the first direction indicator 101 may be the character "+", which indicates to increase the focal length, the second direction indicator 102 may be the character "−", which indicates to decrease the focal length, and the zoom direction indicator includes the first direction indicator and the second direction indicator. Further, as illustrated in FIG. 15, it indicates that the focal length is increasing when the zoom control 104 moves towards the character "+", i.e., the first direction indicator 101, on the zoom progress bar 103 along the direction Y1; and it indicates that the focal length is decreasing when the zoom control 104 moves towards the character "−", i.e., the second direction indicator 102, on the zoom progress bar 103 along the direction Y1.

In the illustrated embodiments of the disclosure, the zoom direction indicator of the real-time zoom speed may be the character "+" or the character "−". This is not limited in the embodiments of the disclosure. For example, with regard to the real-time zoom speed being +3/S, the character "+" is the direction indicator, and 3×/S is the zoom rate of the real-time zoom speed. For another example, with regard to the real-time zoom speed being −1/S, the character "−" is the direction indicator, and 1×/S is the zoom rate of the real-time zoom speed.

In some embodiments of the disclosure, the terminal may preset the correspondence between the zoom direction indicators and adjustment directions of the focal length. For example, the zoom direction indicator "+" may correspond to the increase of the focal length, and the zoom direction indicator "−" may correspond to the decrease of the focal length. In this way, when the zoom speed is determined as "+2×/S", the zoom direction indicator "+" may be determined as increasing the focal length according to the mapping relationship between the zoom direction indicators and the adjustment directions of the focal length, so as to determine +2×/S indicates to increase the camera's focal length by 2× per second.

At S302, increasing, within the preset unit time, the focal length for capturing the target object according to the zoom rate of the real-time zoom speed, when the adjustment direction is to increase the focal length.

In some embodiments of the disclosure, when the terminal determines to increase the focal length according to the zoom direction indicator of the zoom speed, the focal length of the camera for capturing the target object may be increased at the zoom rate of the zoom speed at the end of the preset unit time. In a case where the zoom speed is +2×/S, in response to determining that the zoom direction indicator "+" corresponds to the increase of the focal length, the focal length of the camera for capturing the target object may be increased at a speed of 2× per second.

At S303, decreasing, within the preset unit time, the focal length for capturing the target object according to the zoom rate of the real-time zoom speed, when the adjustment direction is to decrease the focal length.

In some embodiments of the disclosure, when the terminal determines to decrease the focal length according to the zoom direction indicator of the zoom speed, the focal length of the camera for capturing the target object may be decrease at the zoom rate of the zoom speed at the end of the preset unit time. In a case where the zoom speed is −2×/S, in response to determining that the zoom direction indicator "−" corresponds to the decrease of the focal length, the focal length of the camera for capturing the target object may be decreased at a speed of 2× per second.

In the illustrated embodiments of the disclosure, the terminal determines whether to increase or decrease the focal length for capturing the target object according to the preset correspondence between the direction indicators and the zoom direction indicators, and adjusts the focal length at the zoom rate according to the determined adjustment direction. In this way, the focusing process is intuitive by visualizing the adjustment direction of the focal length while the terminal adjusts the camera's focal length according to the zoom speed.

FIG. 16 is still yet another schematic flowchart of a zoom method according to some embodiment of the disclosure. The operation of S302 may be implemented by S3021, which will be described with reference to the operations illustrated in FIG. 16.

At S3021, increasing, within the preset unit time, the focal length for capturing the target object according to the zoom rate of the real-time zoom speed, and stopping adjusting the focal length in response to the adjusted focal length reaching a maximum focal length threshold;

In some embodiments of the disclosure, the focal length of the camera is limited to a numerical range having a maximum value, and the focal length of the camera may be increased within the numerical range until reaching the maximum value corresponding to the numerical range. Exemplarily, the maximum value may be 60×.

In some embodiments of the disclosure, during the performing of the first touch movement operation, in response to determining that the adjustment direction corresponding to the first touch movement operation is to increase the focal length at the end of the preset unit time, the terminal increases, according to the acquired zoom rate corresponding to the real-time zoom speed, the focal length for capturing the target object at the end of the preset unit time, and determines in real time whether the increased focal length reaches the maximum focal length threshold (i.e., the maximum value). Further, the terminal stops adjusting the focal length in response to the focal length reaching the maximum focal length threshold.

In some embodiments of the disclosure, in response to the user's first touch movement operation acting on the display area of the zoom prompt control being an upward sliding operation, the terminal may determine that the adjustment direction corresponding to the upward sliding operation is to increase the focal length. At the end of the preset unit time, the terminal increases the focal length for capturing the target object at the zoom rate corresponding to the real-time zoom speed, and determines in real time whether the increased focal length reaches the maximum focal length threshold. Further, the terminal stops adjusting the focal length in response to the focal length reaching the maximum focal length threshold.

For example, when the first touch movement operation performed by the user's finger in the display area of the zoom prompt control is the upward sliding operation, the terminal may determine that the adjustment direction corresponding to the upward sliding operation is to increase the focal length. At the end of every second, the terminal increases the focal length for capturing the target object at the zoom rate corresponding to the real-time zoom speed, and determines in real time whether the increased focal length reaches the maximum focal length threshold. Further, the terminal stops adjusting the focal length in response to the focal length reaching the maximum focal length threshold. In other words, after the focal length has increased to the maximum focal length threshold based on the upward sliding operation input by the user's finger, the terminal does not continue to increase the focal length for capturing the target object even if the user's finger continues to slide up.

In some embodiments of the disclosure, as illustrated in FIG. 16, the operation of S303 may be implemented by S3031.

At S3031, decreasing, within the preset unit time, the focal length for capturing the target object according to the zoom rate of the real-time zoom speed, and stopping adjusting the focal length in response to the adjusted focal length reaching a minimum focal length threshold.

In the embodiments of the disclosure, during the performing of the first touch movement operation, in response to determining that the adjustment direction corresponding to the first touch movement operation is to decrease the focal length at the end of the preset unit time, the terminal decreases, according to the acquired zoom rate corresponding to the real-time zoom speed, the focal length for capturing the target object at the end of the preset unit time, and determines in real time whether the decreased focal length reaches the minimum focal length threshold. Further, the terminal stops adjusting the focal length in response to the focal length reaching the minimum focal length threshold.

In some embodiments of the disclosure, in response to the user's first touch movement operation acting on the display area of the zoom prompt control being a downward sliding operation, the terminal may determine that the adjustment direction corresponding to the downward sliding operation is to decrease the focal length. At the end of the preset unit time, the terminal decreases the focal length for capturing the target object at the zoom rate corresponding to the real-time zoom speed, and determines in real time whether the decreased focal length reaches the minimum focal length threshold. Further, the terminal stops adjusting the focal length in response to the focal length reaching the minimum focal length threshold.

For example, when the first touch movement operation performed by the user's finger in the display area of the zoom prompt control is the downward sliding operation, the terminal may determine that the adjustment direction corresponding to the downward sliding operation is to decrease the focal length. At the end of every second, the terminal decreases the focal length for capturing the target object at the zoom rate corresponding to the real-time zoom speed, and determines in real time whether the decreased focal length reaches the minimum focal length threshold. Further, the terminal stops adjusting the focal length in response to the focal length reaching the minimum focal length threshold. In other words, after the terminal decreases the focal length to the maximum focal length threshold according to the downward sliding operation input by the user's finger, the terminal does not continue to decrease the focal length for capturing the target object even if the user's finger continues to slide down.

In some embodiments of the disclosure, the focal length of the camera is limited to a numerical range having a minimum value, and the focal length of the camera can be decreased within the numerical range until reaching the minimum value corresponding to the numerical range. Exemplarily, the maximum value may be 5×.

In the illustrated embodiments of the disclosure, the terminal stops adjusting the focal length when the focal length has been adjusted to the maximum focal length threshold or the minimum threshold. As such, it is possible to avoid the problem of consuming power and resources of the terminal caused by continuing to adjust the focal length in a case where the camera's focal length has reached the maximum value and cannot be further increased, or the shooting focal length of the camera has reached the minimum value and cannot be further decreased, so that the resource wasting of the terminal can be reduced.

In some embodiments of the disclosure, the operation of S302 may be implemented by S3022, and the operation of S303 may be implemented by S3032. Details are described as follows.

At S3022, in response to the adjustment direction being to increase the focal length and the zoom rate of the real-time zoom speed being a maximum zoom rate, increasing, according to the maximum zoom rate, the focal length for capturing the target object continuously within each the preset unit time.

In some embodiments of the disclosure, when the terminal determines that the real-time adjustment direction corresponding to the first touch movement operation is to increase the focal length, and the real-time zoom speed has reached the maximum zoom rate, the terminal may continuously adjust the focal length according to the maximum zoom rate at the end of each preset unit time.

In some embodiments of the disclosure, there is the maximum zoom speed (i.e., the maximum value of the zoom speed) corresponding to the zoom rate. Exemplarily, the maximum zoom speed may be +3×/S, and the maximum zoom rate corresponding to the maximum zoom speed is 3×/S.

In the embodiments of the disclosure, in response to the user's first touch movement operation acting on the display area of the zoom prompt control being the upward sliding operation, the terminal may determine that the adjustment direction corresponding to the upward sliding operation is to increase the focal length, and determine whether the zoom rate of the real-time zoom speed reaches the maximum zoom rate. When it is determined that the zoom rate of the real-time zoom speed is the maximum zoom rate, the focal length for capturing the target object is continuously increased at the maximum zoom rate at the end of each preset unit time.

For example, when the first touch movement operation performed by the user's finger in the display area of the zoom prompt control is the upward sliding operation, the terminal may determine that the adjustment direction corresponding to the upward sliding operation is to increase the focal length, and determine whether the zoom rate of the real-time zoom speed reaches the maximum zoom rate, e.g., 3×/S. When it is determined that the zoom rate of the real-time zoom speed is 3×/S, the focal length for capturing the target object is continuously increased by 3×/S at the end of every second.

At S3032, in response to the adjustment direction being to decrease the focal length and the zoom rate of the real-time zoom speed being a maximum zoom rate, decreasing, according to the maximum zoom rate, the focal length for capturing the target object continuously within each the preset unit time.

In some embodiments of the disclosure, when the terminal determines that the real-time adjustment direction corresponding to the first touch movement operation is to decrease the focal length, and the real-time zoom speed has reached the maximum zoom rate, the terminal may continuously adjust the focal length according to the maximum zoom rate at the end of each preset unit time, and the terminal may stop the adjustment in response to the shooting focal length of the camera reaching the minimum focal length.

In the embodiments of the disclosure, there is the maximum zoom speed corresponding to the zoom speed (i.e., the minimum value of the zoom speed). Exemplarily, the maximum zoom speed may be −3×/S, and the maximum zoom rate corresponding to the minimum zoom speed is 3×/S.

In the embodiments of the disclosure, in response to the user's first touch movement operation performed in the display area of the zoom prompt control being the downward sliding operation, the terminal may determine that the adjustment direction corresponding to the downward sliding operation is to decrease the focal length, and determine whether the zoom rate of the real-time zoom speed reaches the maximum zoom rate. When it is determined that the zoom rate of the real-time zoom speed is the maximum zoom rate, the focal length for capturing the target object is continuously decreased at the maximum zoom rate at the end of each preset unit time.

For example, when the first touch movement operation performed by the user's finger in the display area of the zoom prompt control is the downward sliding operation, the terminal may determine that the adjustment direction corresponding to the downward sliding operation is to decrease the focal length, and determine whether the zoom rate of the real-time zoom speed reaches the maximum zoom rate, e.g., 3×/S. When it is determined that the zoom rate of the real-time zoom speed is 3×/S, the focal length for capturing the target object is continuously decreased at 3×/S at the end of every second.

In some embodiments of the disclosure, the terminal may continue to increase, at the maximum zoom rate, the focal length for capturing the target object, and stops the focal length adjustment in response to the focal length being increased to reach the maximum focal length or the end of first touch movement operation.

In some embodiments of the disclosure, the terminal may continue to decrease, at the maximum zoom rate, the focal length for capturing the target object, and stops the focal length adjustment in response to the focal length being decreased to reach the minimum focal length or the end of the first touch movement operation.

In some embodiments of the disclosure, the first touch movement operation is performed continuously. When the touch position changes in real time during the continuous first touch movement operation, the zoom position mapped on the zoom prompt control changes in real time in response to the first touch movement operation, so that the zoom speed determined based on the zoom position also changes in real time. When the touch position stops changing, the zoom position on the zoom prompt control determined by the terminal based on the touch position also stops changing, and thus the real-time zoom speed determined based on the zoom position also stops changing. Therefore, even if the real-time zoom speed is not with the maximum zoom rate, the terminal may continue to increase or decrease the focal length for capturing the target object until the focal length is reduced to the minimum focal length, or until the end of the first touch movement operation.

Figure 17:
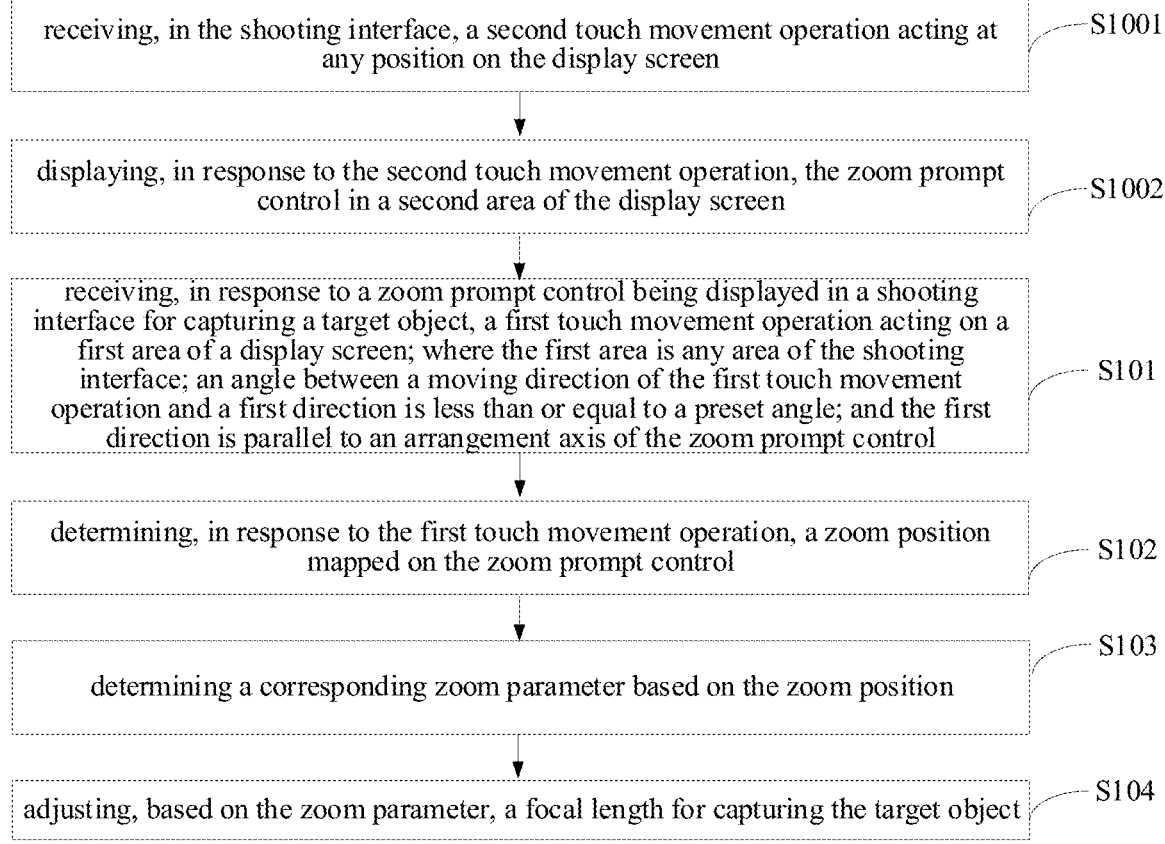
FIG. 17 is still yet another schematic flowchart of a zoom method according to some embodiments of the disclosure.

FIG. 17 is still yet another schematic flowchart of a zoom method according to some embodiment of the disclosure, in which S1001-S1002 may be performed before S101. Details will be described with reference to the operations illustrated in FIG. 17.

At S1001, receiving, in the shooting interface, a second touch movement operation acting at any position on the display screen.

In some embodiments of the disclosure, after entering the shooting mode of the camera, the terminal may receive the second touch movement operation acting at any position on the shooting interface.

In some embodiments of the disclosure, the second touch movement operation may be a touch operation that slides along a preset direction.

In the illustrated embodiments of the disclosure, the second touch movement operation may be a slide-up operation or a slide-down operation. Specifically, the slide-up operation or the slide-down operation may be a sliding operation with an angle between the slide direction and the horizontal direction or vertical direction of the camera shooting interface being less than or equal to the preset angle. This is not limited to the illustrated examples in the embodiments of the disclosure.

In some other embodiments of the disclosure, the second touch movement operation may further be other touch movement operations such as a touch click operation. This is not limited to the illustrated examples in the embodiments of the disclosure.

At S1002, displaying, in response to the second touch movement operation, the zoom prompt control in a second area of the display screen.

In some embodiments of the disclosure, after entering the shooting mode of the camera, the terminal may display, in response to receiving the second touch movement operation acting at any position on the display screen, the zoom prompt control at any position on the shooting interface to enable the zoom function. As such, the zoom prompt control can be used to provide feedback to the user on the adjustment direction of focal length and the zoom position.

Figure 18:
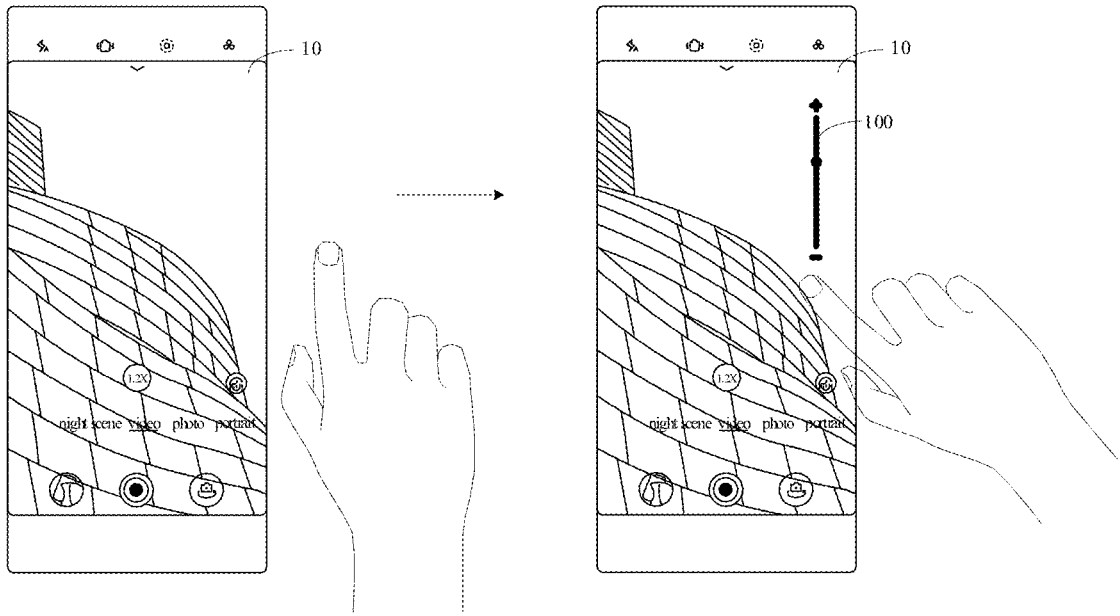
FIG. 18 is a schematic diagram of a display effect of the shooting interface during performing an exemplary second touch movement operation according to some embodiments of the disclosure.

Exemplarily, FIG. 18 is a schematic diagram of a display effect of the shooting interface during performing an exemplary second touch movement operation according to some embodiment of the disclosure. As illustrated in FIG. 18, the zoom prompt control is not displayed on the shooting interface before the terminal receives the second touch movement operation acting on the display screen. When the terminal receives the second touch movement operation acting on the display screen, the zoom prompt control 100 may be displayed on the shooting interface 10, so that the zoom prompt control 100 may be used to provide feedback to the user on the adjustment direction of focal length and the zoom position.

In some embodiments of the disclosure, the display area of the zoom prompt control, i.e., the second area, maybe an area different from the first area. In this way, the user may adjust the focal length of the camera by touching other positions on the shooting screen, even if the user does not touch the area corresponding to the zoom prompt control 100, thereby enlarging the area where the zoom operation can be performed. In some embodiments of the disclosure, the zoom prompt control may be displayed near the boundary of the shooting interface so as to avoid affecting the preview image for the captured object. For example, the zoom prompt control 100 is displayed as illustrated in FIG. 18.

In some embodiments of the disclosure, in response to the second touch movement operation, the terminal enables the zoom function and displays the zoom prompt control in the second area of the display screen. As illustrated in FIG. 11, the zoom prompt control may be displayed in the second area of the display screen with the zoom control 104 being located at the center of the zoom progress bar 103, and the current zoom speed being 0.

In the illustrated embodiments of the disclosure, the terminal enables the zoom function in the shooting interface and displays the zoom prompt control in the second area of the display screen, according to the received second touch movement operation acting at any position on the display screen. In response to receiving the user's second touch movement operation which is input within the second area of the display screen, the terminal may display the zoom prompt control, so that the zoom prompt control may be used to provide feedback to the user on the adjustment direction of focal length and the zoom position.

Figure 19:
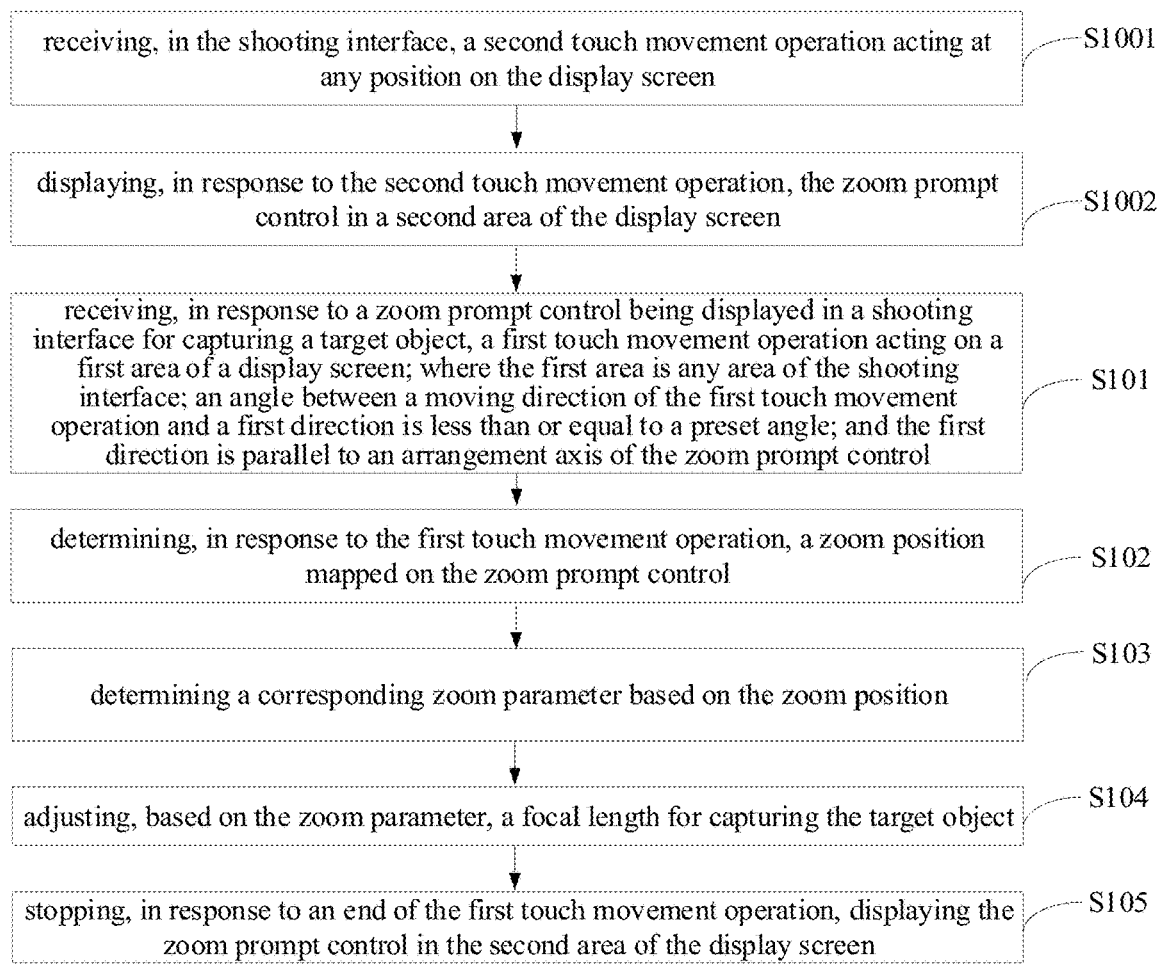
FIG. 19 is still yet another schematic flowchart of a zoom method according to some embodiments of the disclosure.

FIG. 19 is still yet another schematic flowchart of a zoom method according to some embodiment of the disclosure, in which S105 may be performed after S104. Details will be described with reference to the operations illustrated in FIG. 19.

At S105, stopping, in response to an end of the first touch movement operation, displaying the zoom prompt control in the second area of the display screen.

In some embodiments of the disclosure, in response to detecting that the first touch movement operation finishes, the terminal may stop displaying the zoom prompt control in the second area of the display screen, so as to prevent the zoom prompt control 100 from blocking the captured image and improve the effect of previewing the captured image.

Figure 20:
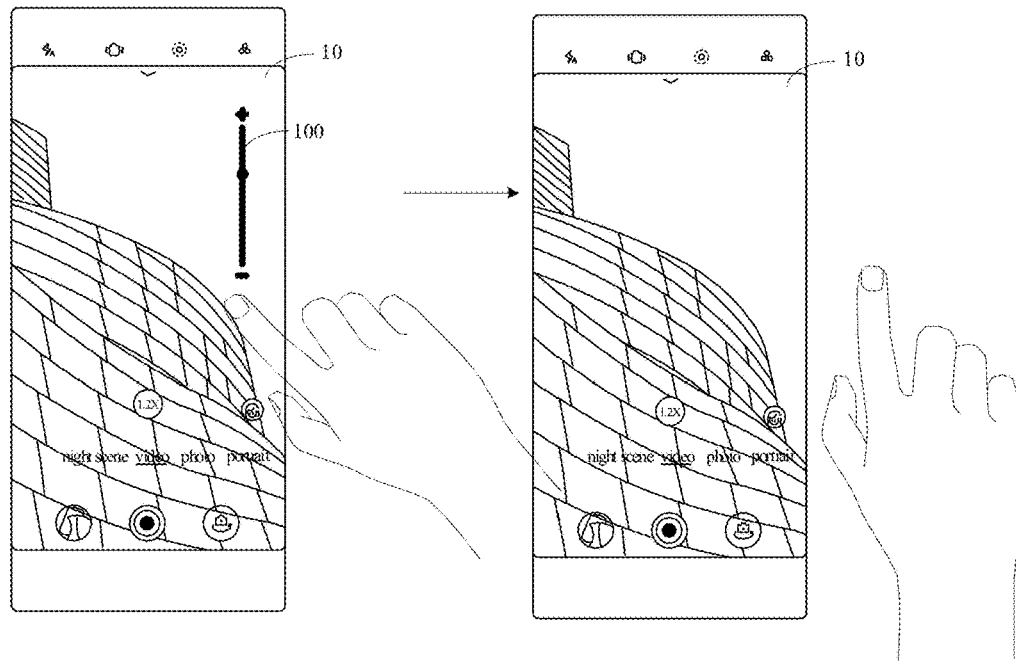
FIG. 20 is a schematic diagram of a display effect of the shooting interface during performing an exemplary first touch movement operation according to some embodiments of the disclosure.

Exemplarily, FIG. 20 is a schematic diagram of a display effect of the shooting interface during performing an exemplary first touch movement operation according to some embodiment of the disclosure. As illustrated in FIG. 20, in the process of receiving the first touch movement operation acting on the display screen, the terminal displays the zoom prompt control 100 in the second area of the shooting interface. The terminal exits from the display of the zoom prompt control 100 in the second area of the shooting interface, in response to detecting the end of the first touch movement operation. As such, the zoom prompt control 100 is not displayed when the user does not adjust the focal length, and the zoom prompt control 100 is prevented from blocking the captured image, thereby improving the effect of previewing the captured image.

In the illustrated embodiments of the disclosure, the terminal exits, in response to the end of the first touch movement operation, from the display of the zoom prompt control in the second area of the display screen. As such, the zoom prompt control is prevented from blocking the captured image, thereby improving the effect of previewing the captured image.

Figure 21:
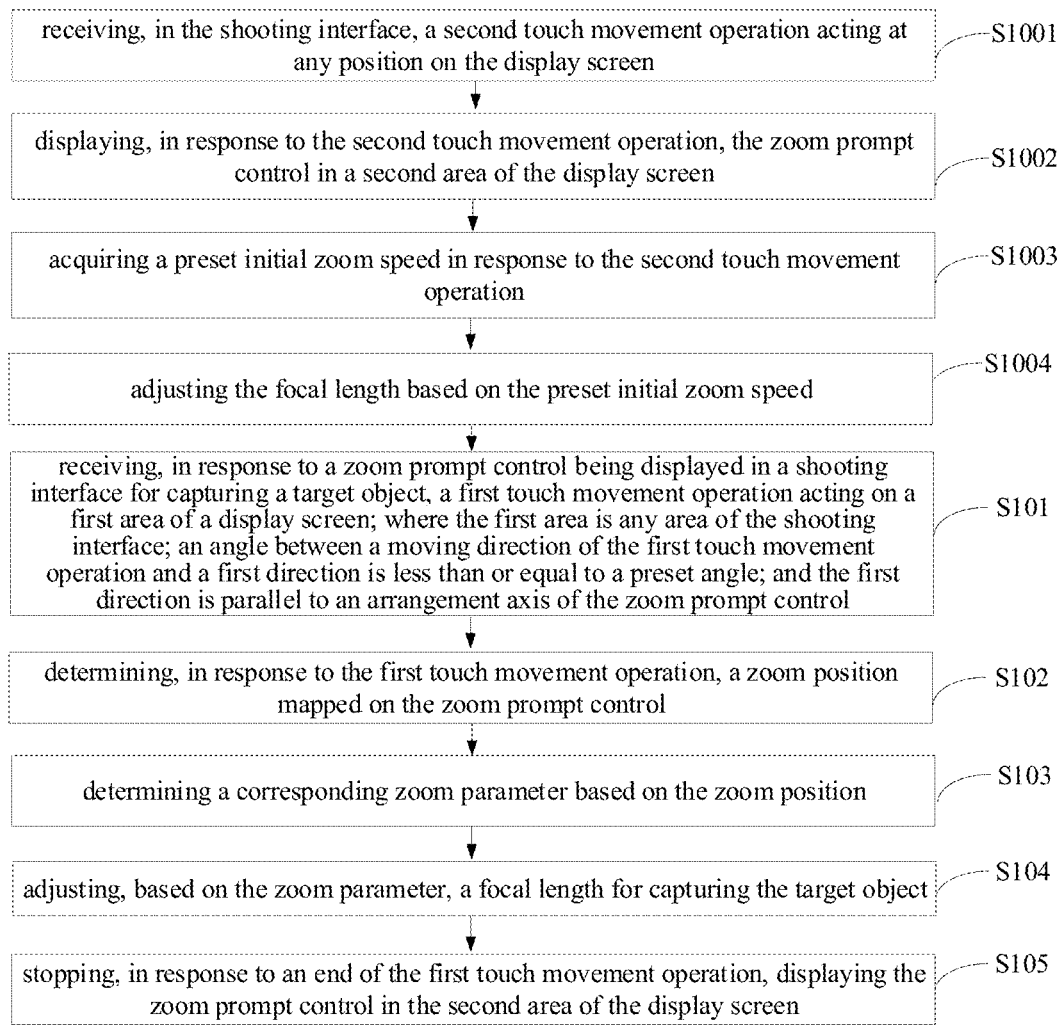
FIG. 21 is still yet another schematic flowchart of a zoom method according to some embodiments of the disclosure.

FIG. 21 is still yet another schematic flowchart of a zoom method according to some embodiment of the disclosure, and the flowchart includes S1003-S1004 which may be performed after S1001. Details will be described with reference to the operations in FIG. 21, by taking an example where S1003-S1004 are specifically performed after S1002 as an example.

At S1003, acquiring a preset initial zoom speed in response to the second touch movement operation.

In some embodiments of the disclosure, it is possible to preset an initial zoom speed corresponding to the second touch movement operation, and the terminal for adjustment may acquire the corresponding initial zoom speed in response to receiving the second touch movement operation acting at any position on the display screen. In some embodiments of the disclosure, the initial zoom speed may be set as 0×/S or 0.5×/S. The initial zoom speed is not limited to these examples in the embodiments of the disclosure. In some embodiments, the zoom prompt control is displayed on the display screen, in response to the second touch movement operation, with the zoom control being preset at the center position of the zoom progress bar. The zoom speed corresponding the center position of the zoom progress bar is taken as the preset initial zoom speed.

In some embodiments of the disclosure, S1003-S1004 and S1002 may be executed at the same time. This is not limited in the embodiments of the disclosure.

At S1004, adjusting the focal length based on the preset initial zoom speed.

In some embodiments of the disclosure, after acquiring the preset initial zoom speed, the terminal may adjust the focal length thereof at the preset initial zoom speed before detecting the first touch movement operation. In some embodiments, after receiving the first touch movement operation, the focal length for capturing the target object is adjusted based on the preset initial zoom speed and the zoom parameter corresponding to the first touch movement operation. For example, the zoom parameter includes the corresponding zoom speed, the terminal adjusts the focal length by adjusting the current zoom speed from the preset initial zoom speed to the corresponding zoom speed.

In the illustrated embodiments of the disclosure, the terminal adjusts the focal length in the shooting interface at the preset initial zoom speed, after receiving the second touch movement operation acting at any position on the display screen. In this way, the terminal may adjust the focal length automatically without the user's manual adjustment, which enriches the zoom modes of the terminal and improves the zoom limitation of the terminal compared to manual adjustment by the user.

Figure 22:
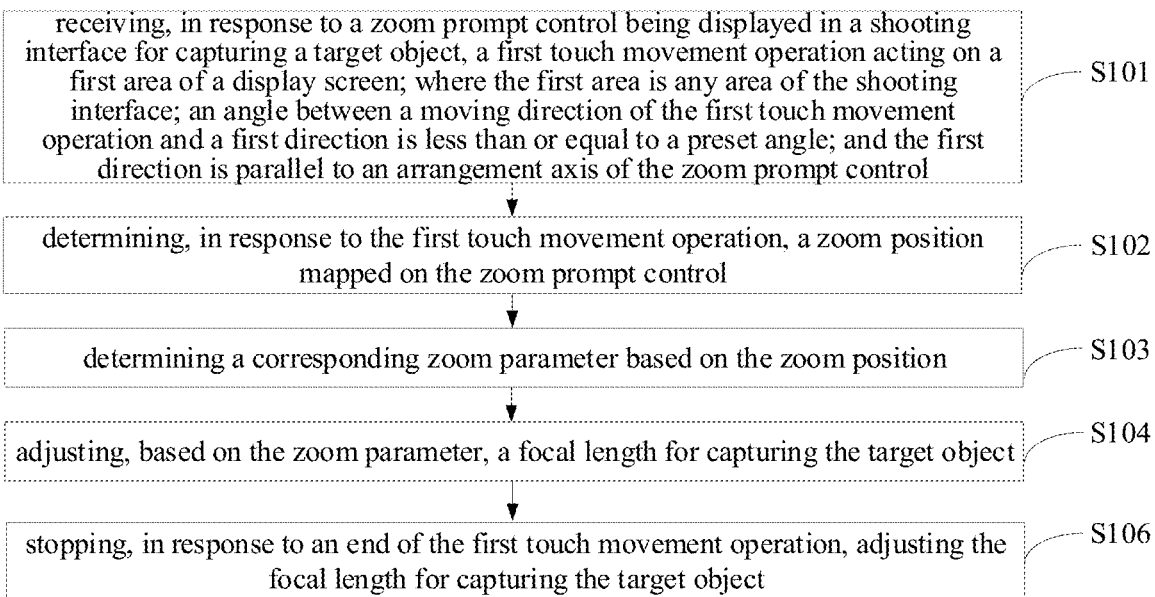
FIG. 22 is still yet another schematic flowchart of a zoom method according to some embodiments of the disclosure.

FIG. 22 is still yet another schematic flowchart of a zoom method according to some embodiment of the disclosure, in which S106 may be performed after S104. Details will be described with reference to the operations illustrated in FIG. 22.

At S106, stopping, in response to an end of the first touch movement operation, adjusting the focal length for capturing the target object.

In some embodiments of the disclosure, the terminal may stop adjusting the focal length for capturing the target object, in response to detecting that the first touch movement operation ends. As such, the focal length may be adjusted accordingly with the user's zoom operation.

In some embodiments of the disclosure, S105 and S106 may be executed at the same time. Alternatively, S105 may be executed after S106. This is not limited in the embodiments of the disclosure.

In the illustrated embodiments of the disclosure, the terminal may stop adjusting the focal length for capturing the target object, in response to detecting that the first touch movement operation ends. As such, the focal length may be adjusted accordingly with the user's zoom operation.

Figure 23:
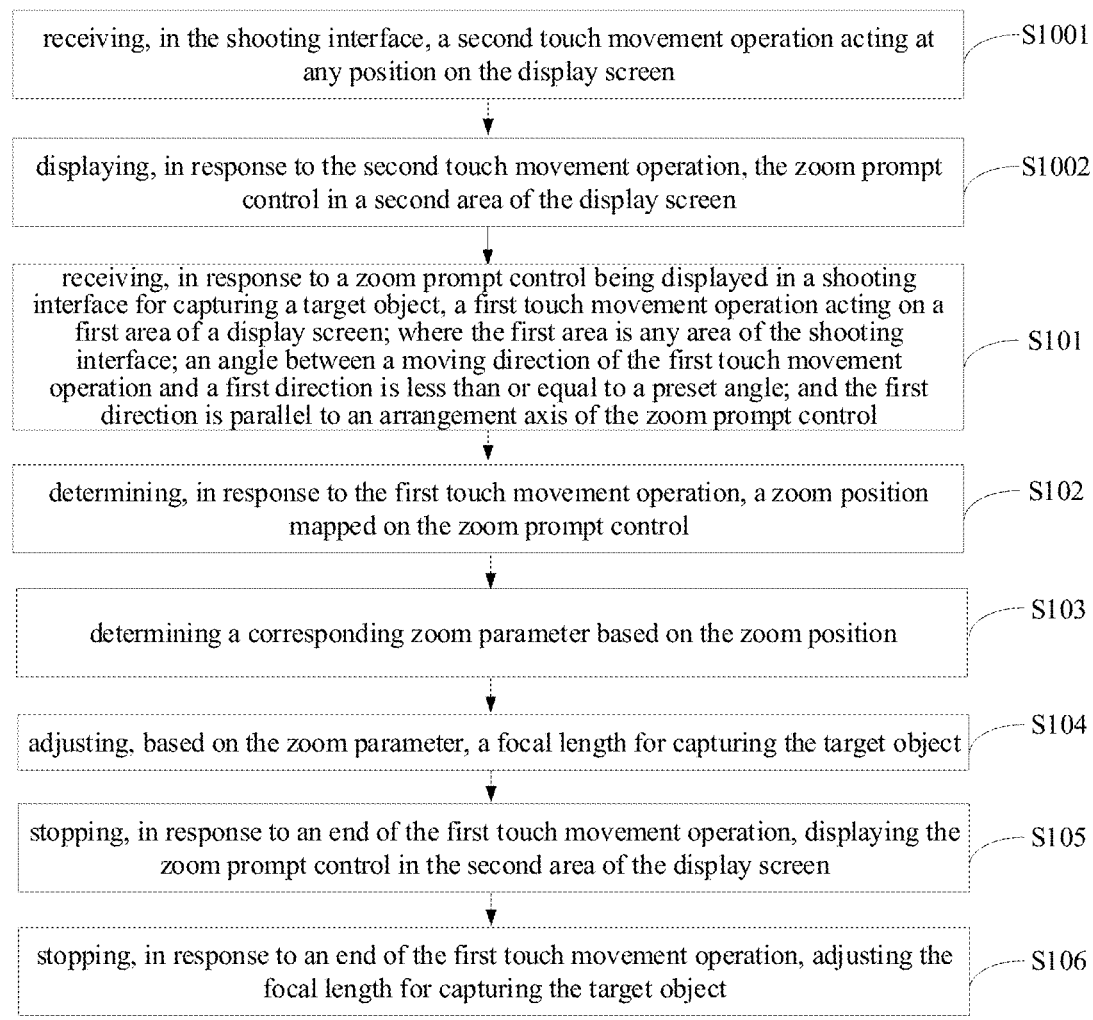
FIG. 23 is still yet another schematic flowchart of a zoom method according to some embodiments of the disclosure.

FIG. 23 is still yet another schematic flowchart of a zoom method according to some embodiment of the disclosure. Details will be described with reference to the operations illustrated in FIG. 23.

At S1001, receiving, in a shooting interface, a second touch movement operation acting at any position on a display screen.

At S1002, displaying, in response to the second touch movement operation, a zoom prompt control in a second area of the display screen.

At S101, receiving, in response to the zoom prompt control being displayed in the shooting interface for capturing a target object, a first touch movement operation acting on a first area of the display screen; where the first area is any area of the shooting interface; an angle between a moving direction of the first touch movement operation and a first direction is less than or equal to a preset angle; and the first direction is parallel to an arrangement axis of the zoom prompt control.

At S102, determining, in response to the first touch movement operation, a zoom position mapped on the zoom prompt control.

At S103, determining a corresponding zoom parameter based on the zoom position.

At S104, adjusting, based on the zoom parameter, a focal length for capturing the target object.

At S105, stopping, in response to an end of the first touch movement operation, displaying the zoom prompt control in the second area of the display screen.

At S106, stopping, in response to an end of the first touch movement operation, adjusting the focal length for capturing the target object.

The following continues to describe an exemplary structure in which the zoom apparatus 455 provided by the embodiments of the disclosure is partially implemented as a software module. As illustrated in FIG. 2, the software module of the zoom apparatus 455 stored in the memory 450 may include a receiving module 4551, a determining module 4552 and an adjusting module 4553.

The receiving module 4551 is configured to receive, in response to a zoom prompt control being displayed in a shooting interface for capturing a target object, a first touch movement operation acting on a first area of a display screen; where the first area is any area of the shooting interface; an angle between a moving direction of the first touch movement operation and a first direction is less than or equal to a preset angle; and the first direction is parallel to an arrangement axis of the zoom prompt control.

The determining module 4552 is configured to determine, in response to the first touch movement operation, a zoom position mapped on the zoom prompt control.

The determining module 4552 is further configured to determine a corresponding zoom parameter based on the zoom position.

The adjusting module 4553 is configured to adjust, based on the zoom parameter, a focal length for capturing the target object.

In some embodiments of the disclosure, the zoom prompt control includes a zoom progress bar and a zoom control. The determining module 4552 is further configured to:

determine, in response to a movement the first touch movement operation, a real-time movement distance and a movement direction within a preset unit time; map, according to a preset mapping relationship, the real-time movement distance into a control movement distance on the zoom progress bar for the zoom control; and move, according to the movement direction, the zoom control on the zoom progress bar by the control movement distance to thereby obtain the zoom position.

In some embodiments of the disclosure, the determining module 4552 is further configured to:

determine, in response to the movement of the first touch movement operation, the movement direction of the first touch movement operation, a starting touch position of the first touch movement operation on the display screen, and a real-time touch position generated in a touch movement process of the first touch movement operation within the preset unit time; and take, as the real-time movement distance, a distance between the starting touch position and the real-time touch position.

In some embodiments of the disclosure, the zoom parameter includes a zoom speed. The determining module 4552 is further configured to:

determine, based on a preset correspondence between multiple positions of the zoom control and multiple zoom speeds, a real-time zoom speed corresponding to the zoom position, where the plurality of positions and the plurality of zoom speeds are in one-to-one correspondence.

In some embodiments of the disclosure, the adjusting module 4553 is further configured to adjust, within the preset unit time, the focal length for capturing the target object according to the real-time zoom speed.

In some embodiments of the disclosure, the zoom prompt control includes a zoom direction indicator including a first direction indicator and a second direction indicator; the first direction identification indicates an increase of the focal length, and the second direction indicator indicates a decrease of the focal length; the real-time zoom speed includes the zoom direction indicator and a zoom rate; and the adjusting module 4553 is further configured to:

determine, according to a preset correspondence between direction indicators and zoom direction indicators, an adjustment direction corresponding to the zoom direction indicator of the real-time zoom speed; increase, within the preset unit time, the focal length for capturing the target object according to the zoom rate of the real-time zoom speed, when the adjustment direction is to increase the focal length; or decrease, within the preset unit time, the focal length for capturing the target object according to the zoom rate of the real-time zoom speed, when the adjustment direction is to decrease the focal length.

In some embodiments of the disclosure, the adjusting module 4553 is further configured to:

increase, within the preset unit time, the focal length for capturing the target object according to the zoom rate of the real-time zoom speed, and stop adjusting the focal length in response to the adjusted focal length reaching a maximum focal length threshold; or decrease, within the preset unit time, the focal length for capturing the target object according to the zoom rate of the real-time zoom speed, and stop adjusting the focal length in response to the adjusted focal length reaching a minimum focal length threshold.

In some embodiments of the disclosure, the adjusting module 4553 is further configured to:

in response to the adjustment direction being to increase the focal length and the zoom rate of the real-time zoom speed being a maximum zoom rate, increase, according to the maximum zoom rate, the focal length for capturing the target object continuously within each the preset unit time; or in response to the adjustment direction being to decrease the focal length and the zoom rate of the real-time zoom speed being a maximum zoom rate, decrease, according to the maximum zoom rate, the focal length for capturing the target object continuously within each the preset unit time.

In some embodiments of the disclosure, the receiving module 4551 is further configured to:

receive, in the shooting interface, a second touch movement operation acting at any position on the display screen, before the receiving a first touch movement operation acting on a first area of a display screen.

The zoom apparatus further includes a displaying module 4554, which is configured to display, in response to the second touch movement operation, the zoom prompt control in a second area of the display screen.

In some embodiments of the disclosure, the displaying module 4554 is further configured to:

stop, in response to an end of the first touch movement operation, displaying the zoom prompt control in the second area of the display screen.

In some embodiments of the disclosure, the adjusting module 4553 is further configured to:

acquire a preset initial zoom speed in response to the second touch movement operation; and adjust the focal length based on the preset initial zoom speed.

In some embodiments of the disclosure, the adjusting module 4553 is further configured to:

stop, in response to an end of the first touch movement operation, adjusting the focal length for capturing the target object.

The embodiments of the disclosure provide a zoom device including a memory and a processor. The memory is configured to store an executable computer program; and the processor is configured to execute the executable computer program stored in the memory to thereby implement the method according to the embodiments of the disclosure, e.g., the zoom method.

The embodiments of the disclosure provide a non-transitory computer-readable storage medium storing executable instructions. When the executable instruction is executed by a processor, the processor is caused to implement the foregoing method according to the embodiments of the disclosure, for example, the zoom method.

In some embodiments of the disclosure, the computer-readable storage medium may be a memory such as a FRAM, a ROM, a PROM, an EPROM, an EEPROM, a flash memory, a magnetic memory, a compact disc, or a CD-ROM; or may be various devices including one of or any combination of the foregoing memories.

In some embodiments of the disclosure, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

For example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

For example, the executable instructions can be deployed for execution on one computing device, execution on multiple computing devices located at one location, or execution on multiple computing devices that are distributed at multiple locations and are interconnected through a communication network.

Based on the above, by implementing the technical solution, it is possible to receive the first touch movement operation acting in any area of the shooting interface when the zoom prompt control is displayed, so that the function of adjusting the focal length for capturing the target object can be achieved by touching any area. In other words, the zoom touch operation may be performed on the area without displaying the zoom prompt control, which enlarges the area where the zoom operation can be performed, thereby improving the human-computer interaction performance. Furthermore, the zoom prompt control begins to be displayed in response to receiving the user's second touch movement operation input in the second area of the display screen, so that the zoom prompt control may be used to provide feedback to the user on the adjustment direction of focal length and the zoom position, which makes the zoom adjustment process intuitive. In addition, the focal length is adjusted at a preset initial zoom speed after receiving the second touch movement operation acting at any position on the display screen, which enriches the zoom modes of the terminal and reduces the zoom limitation of the terminal compared to manual adjustment by the user.

The foregoing descriptions are merely some embodiments of the disclosure and are not intended to limit the protection scope of the disclosure. Any modification, equivalent replacement, or improvement made without departing from the spirit and range of the disclosure shall fall within the protection scope of the disclosure.

The embodiments of the disclosure provide a zoom method, a zoom apparatus, a zoom device and a computer-readable storage medium. A first touch movement operation acting on a first area of a display screen is received, in response to a zoom prompt control being displayed in a shooting interface for capturing a target object. The first area is any area of the shooting interface; an angle between a moving direction of the first touch movement operation and a first direction is less than or equal to a preset angle; and the first direction is parallel to an arrangement axis of the zoom prompt control. A zoom position mapped on the zoom prompt control is determined, in response to the first touch movement operation. A corresponding zoom parameter is determined based on the zoom position; and a focal length for capturing the target object is adjusted based on the zoom parameter. By implementing the technical solution, it is possible to receive the first touch movement operation acting in any area of the shooting interface when the zoom prompt control is displayed, so that the function of adjusting the focal length for capturing the target object can be achieved by touching any area. In other words, the zoom touch operation may act on the area without displaying the zoom prompt control, which expands the area where the zoom operation can be performed, thereby improving the human-computer interaction performance.

What is claimed is:

1. A zoom method, comprising:
   receiving, in response to a zoom prompt control being displayed in a shooting interface for capturing a target object, a first touch movement operation acting on a first area of a display screen;
   wherein the first area is any area of the shooting interface; an angle between a moving direction of the first touch movement operation and a direction parallel to an arrangement axis of the zoom prompt control is less than or equal to a preset angle;
      determining, in response to the first touch movement operation, a zoom position mapped on the zoom prompt control;
      determining a corresponding zoom parameter based on the zoom position; and
      adjusting, based on the zoom parameter, a focal length for capturing the target object;
      wherein the zoom parameter comprises a zoom speed, and determining the zoom parameter based on the zoom position, comprises:
         determining, based on a preset correspondence between a plurality of zoom positions of the zoom prompt control and a plurality of zoom speeds, a real-time zoom speed corresponding to the zoom position, wherein the plurality of zoom positions and the plurality of zoom speeds are in one-to-one correspondence.

2. The method as claimed in claim 1, wherein the zoom prompt control comprises a zoom progress bar and a zoom control; and determining, in response to the first touch movement operation, the zoom position mapped on the zoom prompt control, comprises:
   determining, in response to a movement of the first touch movement operation, a real-time movement distance and a movement direction within a preset unit time;
   mapping, according to a preset mapping relationship, the real-time movement distance into a control movement distance on the zoom progress bar for the zoom control; and
   moving, according to the movement direction, the zoom control on the zoom progress bar by the control movement distance to thereby obtain the zoom position.

3. The method as claimed in claim 2, wherein determining, in response to the movement of the first touch movement operation, the real-time movement distance and the movement direction, comprises:
   determining, in response to the movement of the first touch movement operation, the movement direction of the first touch movement operation, a starting touch position of the first touch movement operation on the display screen, and a real-time touch position generated in a touch movement process of the first touch movement operation within the preset unit time; and
   taking, as the real-time movement distance, a distance between the starting touch position and the real-time touch position.

4. The method as claimed in claim 2, wherein the real-time movement distance corresponding to the first touch movement operation is positively related to the control movement distance on the zoom progress bar.

5. The method as claimed in claim 2, wherein the real-time movement distance corresponding to the first touch movement operation corresponds to a distance between the zoom position and a starting position of the zoom control on the zoom progress bar.

6. The method as claimed in claim 2, wherein the preset mapping relationship is a correspondence relationship or a proportional relationship between the real-time movement distance of the first touch movement operation on the display screen and the control movement distance.

7. The method as claimed in claim 2, wherein the preset mapping relationship is configured to map a movement speed and an action time of the first touch movement operation on the display screen into a movement speed and an action time on the zoom prompt control.

8. The method as claimed in claim 1, wherein adjusting, based on the zoom parameter, the focal length for capturing the target object, comprises:
   adjusting, within a preset unit time, the focal length for capturing the target object according to the real-time zoom speed.

9. The method as claimed in claim 8, wherein the zoom prompt control comprises a zoom direction indicator including a first direction indicator and a second direction indicator; the first direction indicator indicates an increase of the focal length, and the second direction indicator indicates a decrease of the focal length; the real-time zoom speed comprises the zoom direction indicator and a zoom rate; and adjusting, within the preset unit time, the focal length for capturing the target object according to the real-time zoom speed, comprises:
   determining, according to a preset correspondence between direction indicators and zoom direction indicators, an adjustment direction corresponding to the zoom direction indicator of the real-time zoom speed;
   increasing, within the preset unit time, the focal length for capturing the target object according to the zoom rate of the real-time zoom speed, when the adjustment direction is to increase the focal length; or
   decreasing, within the preset unit time, the focal length for capturing the target object according to the zoom rate of the real-time zoom speed, when the adjustment direction is to decrease the focal length.

10. The method as claimed in claim 9, wherein increasing, within the preset unit time, the focal length for capturing the target object according to the zoom rate of the real-time zoom speed, comprises:
    increasing, within the preset unit time, the focal length for capturing the target object according to the zoom rate of the real-time zoom speed, and stopping adjusting the focal length in response to the adjusted focal length reaching a maximum focal length threshold;
    wherein decreasing, within the preset unit time, the focal length for capturing the target object according to the zoom rate of the real-time zoom speed, comprises:
    decreasing, within the preset unit time, the focal length for capturing the target object according to the zoom rate of the real-time zoom speed, and stopping adjusting the focal length in response to the adjusted focal length reaching a minimum focal length threshold.

11. The method as claimed in claim 9, wherein increasing, within the preset unit time, the focal length for capturing the target object according to the zoom rate of the real-time zoom speed, comprises:
    in response to the adjustment direction being to increase the focal length and the zoom rate of the real-time zoom speed being a maximum zoom rate, increasing, according to the maximum zoom rate, the focal length for capturing the target object continuously within each the preset unit time;

wherein decreasing, within the preset unit time, the focal length for capturing the target object according to the zoom rate of the real-time zoom speed, comprises:

in response to the adjustment direction being to decrease the focal length and the zoom rate of the real-time zoom speed being the maximum zoom rate, decreasing, according to the maximum zoom rate, the focal length for capturing the target object continuously within each the preset unit time.

12. The method as claimed in claim 1, wherein before receiving the first touch movement operation acting on the first area of the display screen, the method further comprises:

receiving, in the shooting interface, a second touch movement operation acting at any position of the display screen; and displaying, in response to the second touch movement operation, the zoom prompt control in a second area of the display screen.

13. The method as claimed in claim 12, further comprising:

stopping, in response to an end of the first touch movement operation, displaying the zoom prompt control in the second area of the display screen.

14. The method as claimed in claim 1, wherein after adjusting, based on the zoom parameter, the focal length for capturing the target object, the method further comprises:

stopping, in response to an end of the first touch movement operation, adjusting the focal length for capturing the target object.

15. The method as claimed in claim 1, further comprising:

after determining the zoom parameter corresponding to the zoom position, displaying the zoom parameter on the shooting interface.

16. The method as claimed in claim 1, wherein before receiving the first touch movement operation acting on the shooting interface, the method further comprises:

acquiring a preset initial zoom speed, in response to a second touch movement operation acting at any position on the shooting interface; and adjusting the focal length based on the preset initial zoom speed.

17. The method as claimed in claim 1, wherein the zoom parameter comprises a value of the focal length, and the zoom prompt control comprises a zoom progress bar and a zoom control, and determining the corresponding zoom parameter based on the zoom position, comprises:

determining, based on the zoom position of the zoom control on the zoom progress bar, the value of the focal length corresponding to the zoom position;

wherein adjusting, based on the zoom parameter, the focal length for capturing the target object, comprises:

transmitting an adjustment instruction to a camera, thereby enabling the camera to adjust a current focal length to the value of the focal length.

18. A zoom device, comprising:

a memory, configured to store an executable computer program; and a processor, configured to execute the executable computer program stored in the memory to thereby implement a zoom method comprising:

receiving, in response to a zoom prompt control being displayed in a shooting interface for capturing a target object, a touch movement operation acting on the shooting interface;

determining a zoom position mapped on the zoom prompt control, in response to determining that an angle between a moving direction of the touch movement operation and a direction parallel to an arrangement axis of the zoom prompt control is less than or equal to a preset angle;

determining a zoom parameter corresponding to the zoom position; and adjusting, based on the zoom parameter, a focal length for capturing the target object;

wherein before receiving the touch movement operation acting on the shooting interface, the method further comprises:

receiving, in the shooting interface, another touch movement operation acting at any position on the shooting interface; and displaying, in response to the another touch movement operation, the zoom prompt control in the shooting interface.

19. The zoom device as claimed in claim 18, wherein the zoom parameter comprises a zoom speed, and determining the zoom parameter corresponding to the zoom position, comprises:

determining, based on a preset correspondence between a plurality of zoom positions of the zoom prompt control and a plurality of zoom speeds, a real-time zoom speed corresponding to the zoom position, wherein the plurality of zoom positions and the plurality of zoom speeds are in one-to-one correspondence; and wherein adjusting, based on the zoom parameter, the focal length for capturing the target object, comprises:

adjusting, within a preset unit time, the focal length for capturing the target object according to the real-time zoom speed.

20. A non-transitory computer-readable storage medium stored with a computer program, wherein the computer program is configured to be executed by a processor to implement a zoom method comprising:

acquiring a preset initial zoom speed, in response to a second touch movement operation acting at any position on a shooting interface;

adjusting a focal length based on the preset initial zoom speed;

receiving, in response to a zoom prompt control being displayed in the shooting interface for capturing a target object, a first touch movement operation acting on the shooting interface;

wherein an angle between a moving direction of the first touch movement operation and a direction parallel to an arrangement axis of the zoom prompt control is less than or equal to a preset angle;

determining, in response to the first touch movement operation, a zoom position mapped on the zoom prompt control;

determining a corresponding zoom parameter based on the zoom position; and adjusting, based on the zoom parameter, the focal length for capturing the target object.

* * * * *